United States Patent
Qadri et al.

(10) Patent No.: US 11,366,466 B1
(45) Date of Patent: Jun. 21, 2022

(54) PREDICTIVE MAINTENANCE TECHNIQUES AND ANALYTICS IN HYBRID CLOUD SYSTEMS

(71) Applicant: MICROSOFT TECHNOLOGY LICENSING, LLC, Redmond, WA (US)

(72) Inventors: Faraz Habib Qadri, Redmond, WA (US); Aniket Avinash Malatpure, Redmond, WA (US); Filippo Seracini, Kirkland, WA (US); Shireen Isab, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/134,057

(22) Filed: Dec. 24, 2020

(51) Int. Cl.
    G06F 11/07     (2006.01)
    G05B 23/02     (2006.01)
    G06F 11/30     (2006.01)

(52) U.S. Cl.
     CPC ........ G05B 23/0283 (2013.01); G06F 11/079 (2013.01); G06F 11/0709 (2013.01); G06F 11/3006 (2013.01)

(58) Field of Classification Search
     CPC ............... G06F 11/0709; G06F 11/079; G06F 11/3006; G05B 23/0283
     USPC ....................................................... 714/25, 26
     See application file for complete search history.

(56) References Cited

U.S. PATENT DOCUMENTS

| | | | |
|---|---|---|---|
| 11,163,624 B2 * | 11/2021 | Colgrove | G06F 11/0727 |
| 11,243,522 B2 * | 2/2022 | Celia | G05B 23/0229 |
| 11,243,528 B2 * | 2/2022 | Celia | H04B 17/318 |
| 2004/0059966 A1 | 3/2004 | Chan et al. | |
| 2014/0122706 A1 * | 5/2014 | Boerner | H04L 41/5009 709/224 |
| 2017/0163742 A1 * | 6/2017 | Chou | H04L 41/5019 |
| 2018/0365126 A1 * | 12/2018 | Edwards | G06F 11/0793 |
| 2019/0324444 A1 * | 10/2019 | Celia | G06N 3/0436 |

FOREIGN PATENT DOCUMENTS

WO WO-2014024251 A1 * 2/2014 ............. G06Q 10/06

OTHER PUBLICATIONS

"International Search Report and Written Opinion Issued in PCT Application No. PCT/US21/060911", dated Mar. 25, 2022, 12 pages.

* cited by examiner

*Primary Examiner* — Chae M Ko
(74) *Attorney, Agent, or Firm* — Scott Y. Shigeta; Newport IP, LLC

(57) ABSTRACT

The techniques disclosed herein enable predictive maintenance features in Hybrid Cloud systems. The system can analyze system data defining one or more operating conditions of an on-prem server and determine if one or more predetermined conditions are met. If a predetermined condition is met, the on-prem server can generate and transmit log data to a primary server. The primary server can generate one or more monitor rules having one or more updated predetermined conditions for detecting an anomaly at the on-prem server. Using the monitor rules, the on-prem server can detect and proactively resolve potential issues. The on-prem server can also transmit diagnostic data to the primary server for generating an updated monitor rule that is further tailored to the conditions of the on-prem server.

20 Claims, 12 Drawing Sheets

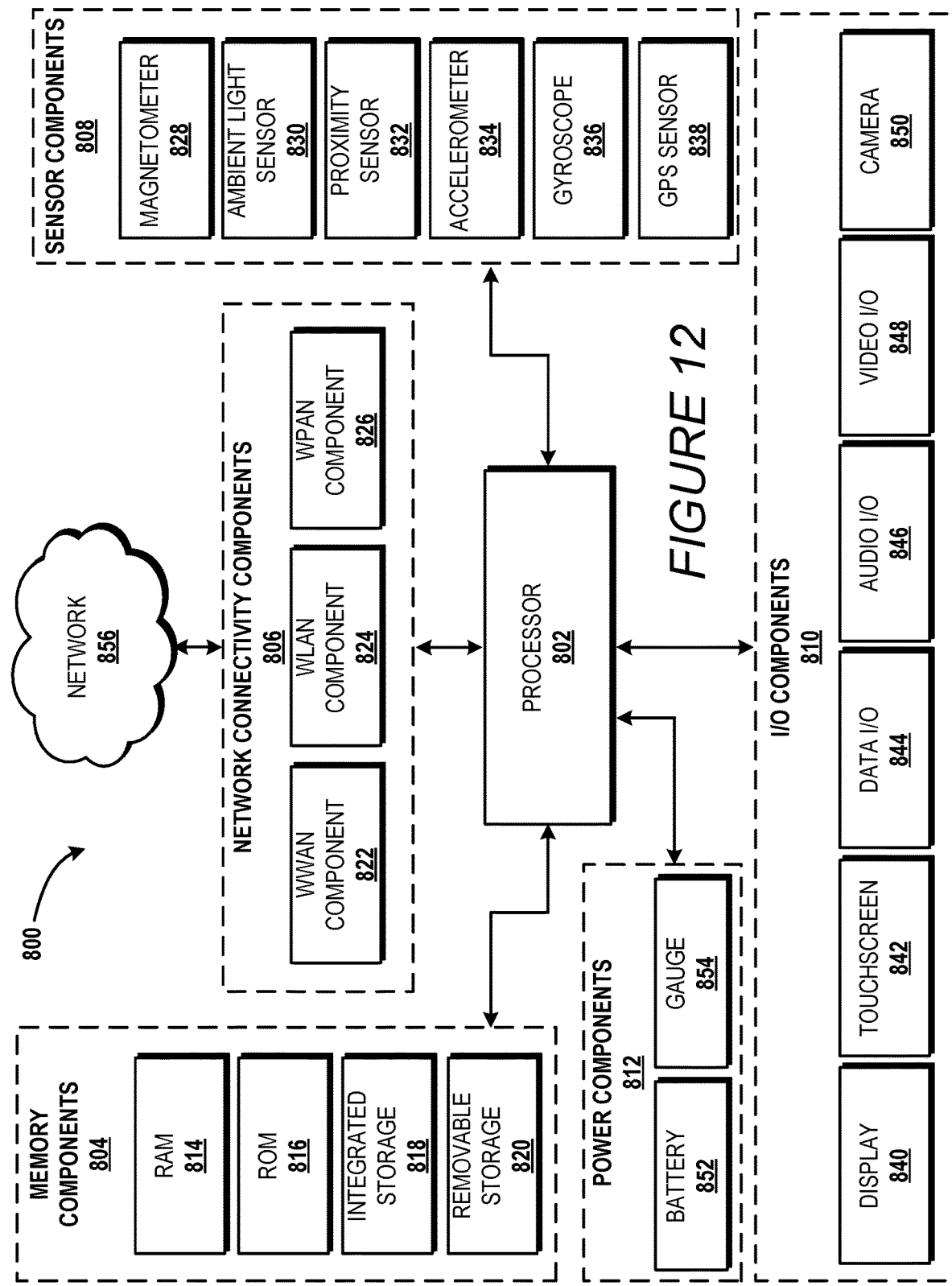

PREDICTIVE MAINTENANCE TECHNIQUES AND ANALYTICS IN HYBRID CLOUD SYSTEMS

BACKGROUND

Datacenters provide a wide range of services to businesses and individuals. The services can include, but are not limited to, software as a service (SaaS), infrastructure as a service (IaaS), platform as a service (PaaS), desktop as a service (DaaS), managed software as a service (MSaaS), etc. In many instances, datacenters store data as well as manage processes for consumers of the services. With the increasing popularity of streaming services, remote data hosting, and collaboration tools, there is accordingly increasing demand for datacenter infrastructure and services.

To address a wide range of user requirements, including privacy and mobility requirements, Hybrid Cloud systems have been introduced. A Hybrid Cloud system includes one or more on-premises ("on-prem") servers that work in conjunction with the services that are provided by a centralized server located at a datacenter. On-prem servers are often at a location that is controlled by a consumer entity. By utilizing on-prem servers, Hybrid Cloud systems allow consumers to have control over a computing environment while leveraging the infrastructure and services provided at a datacenter. Such an arrangement may be needed when a system is used in multiple jurisdictions having different privacy requirements. For instance, when a datacenter is located in one country, a consumer located in another country may not be allowed to store data at the datacenter. Thus, causing a need for data to be stored on an on-prem server. Similar requirements may be caused by government contracts, etc. In addition, Hybrid Cloud systems allow for more continuous access to services when an application requires mobility of computing resources. For example, in a scenario involving cruise ships, an on-prem server may be physically and communicatively isolated from a datacenter. Since such on-prem servers may not be continually connected, data needs to be stored and processed locally while having periodic connectivity to a datacenter.

Although Hybrid Cloud systems have been useful for meeting some specific needs, some existing systems still have a number of drawbacks. For example, Hybrid Cloud systems can make it difficult to detect issues with data being stored and processed on the on-prem server. In one illustrative example, a shipping company may have an on-prem server on a boat with limited connectivity. In such scenarios, given the intermittent and limited connectivity, the hybrid arrangement can make it difficult for a service running in a datacenter to proactively detect issues since all or a portion of the data is stored and processed at the on-prem server.

In another example, since some existing architectures have multiple on-prem servers that can detect issues, each server may generate their own set of logs. This can make diagnostic solutions incredibly complex, especially for errors coming from multiple infrastructure components. In addition, such arrangements create a vast amount of data that cannot be practically communicated over a network, particularly with remote on-prem servers that have limited connectively to a datacenter. Further, given the remote nature of the on-prem servers, network latency issues may create other problems for a system's ability to effectively detect issues, let alone detect issues in time to take proactive measures.

In yet another example, although some existing architectures detect some errors, such systems often require significant support resources to diagnose and address malfunctions. A typical support scenario involves a user detecting an issue at the on-prem server and opening a support ticket with the service provider resulting in an extended period of reduced performance. In severe cases, the entire on-prem infrastructure must be taken offline for an extended time potentially leading to a lapse in critical applications. Such reactive support techniques may negatively impact goals of both users and service providers and require extensive engineering support. Thus, there is a need for hybrid service providers to anticipate and proactively address issues by predicting future trends in the system while also accommodating the limitations of existing architectures.

SUMMARY

The disclosed techniques improve the efficiency and functionality of Hybrid Cloud systems by enabling predictive maintenance through an analysis of operating conditions and system health. Generally described, on-prem servers and centralized servers at a datacenter coordinate to control the amount of log data communicated over a network. The system can also generate and update monitor rules for allowing the on-prem server to take proactive steps to avoid a system failure. For example, an on-prem server may experience a malfunction such as storage drive failure. Upon detecting a malfunction, the server can collect system logs and telemetry data to enable a user or support provider (e.g. a system engineer) to identify the root cause of the malfunction. A system log, for instance, can define operating conditions, e.g., a data rate of a faulty storage drive and specifications of the of the storage drive. The system can then communicate the logs and telemetry data to a datacenter, e.g., a primary or centralized server, for additional analysis. The centralized server can then utilize the logs and telemetry data to generate a set of monitor rules that is tailored to the on-prem server. For example, the monitor rules can define operating condition thresholds for a particular type of hardware and software running on the on-prem server. The on-prem server can employ the monitor rules to keep track of more specific operating conditions to predict future trends in the system and anticipate malfunctions. Upon detecting an anomaly (e.g., a trend that indicates a potential malfunction) based on the monitor rules, the system can collect relevant diagnostic data and raise a proactive maintenance alert allowing a user at the on-prem server to resolve issues before they cause any downtime or impact critical applications. In addition, the on-prem server can communicate the diagnostic data to the service provider to notify the centralized server whether issues were detected and resolved. The centralized server can then generate additional iterations of the monitor rules with updated thresholds. The on-prem server can then use the updated thresholds to anticipate future malfunctions more accurately without requiring the transmission of full system logs and telemetry data.

By employing a tailored set of monitor rules to predict and proactively resolve issues at an on-prem server, a system can bypass the significant downtime and expense of typical maintenance and support solutions. The disclosed techniques can also improve the performance of Hybrid Cloud systems. By proactively resolving potential issues, the system may avoid even minor performance degradation associated with regular maintenance much less the complete downtime of major malfunctions. The disclosed techniques can also improve security by detecting potential vulnerabilities in the on-prem server before they are exploited. The disclosed techniques also allow an individual on-prem server to provide data that enables a centralized server to update monitor rules that can be used to detect problems in other on-prem servers. The disclosed techniques can also save computing resources, such as processing cycles, memory resources, and networking resources, by only transmitting select diagnostic data to generate new iterations of monitor rules rather than full system logs and telemetry data.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 12 is a computer architecture diagram illustrating a computing device architecture for a computing device capable of implementing aspects of the techniques and technologies presented herein.

DETAILED DESCRIPTION

Figure 1:
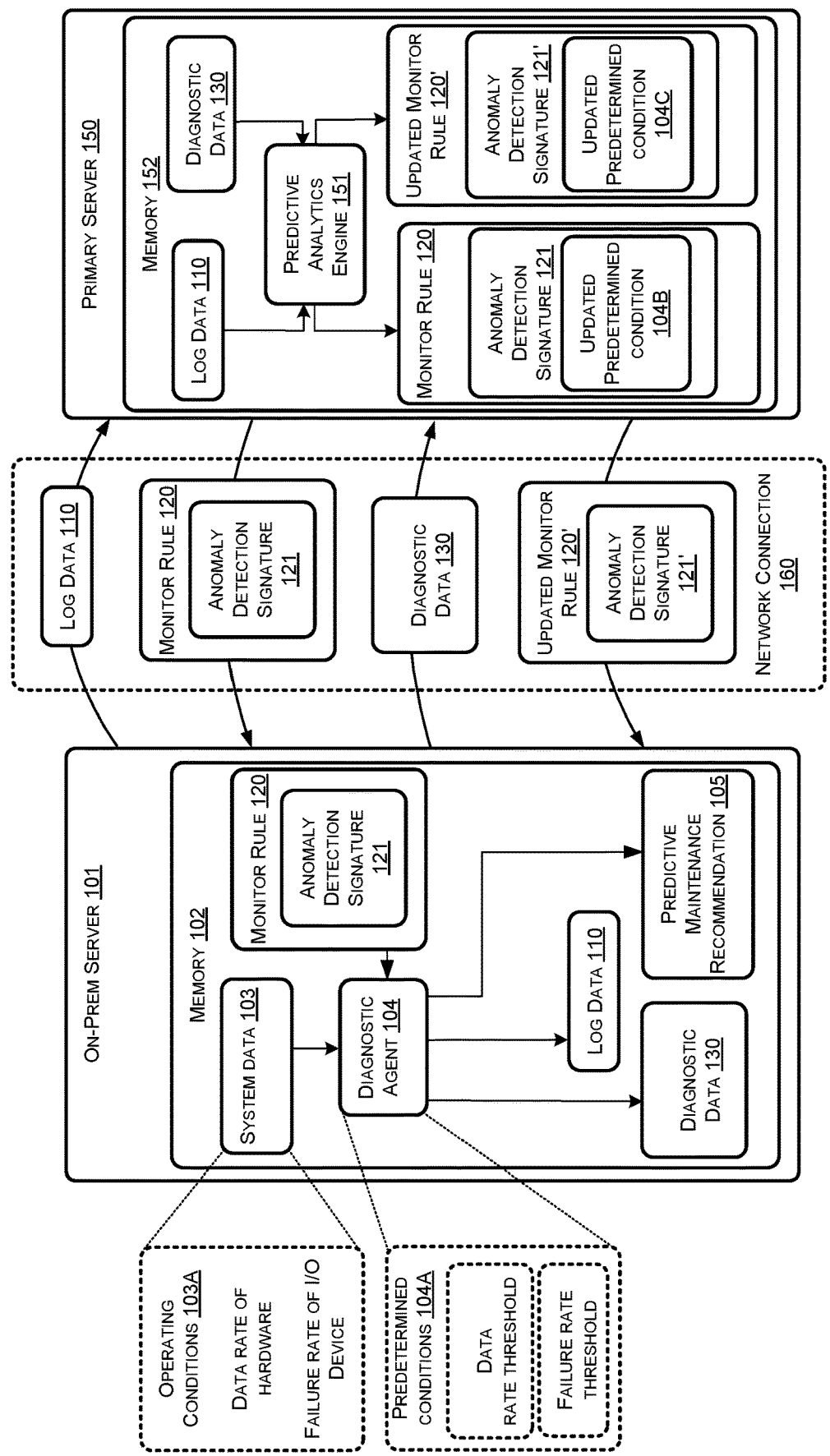
FIG. 1 is a block diagram of a system for enabling predictive maintenance features in a Hybrid Cloud system.

The techniques disclosed herein provide systems for optimizing the use of computing resources and to improve the operation of Hybrid Cloud systems by the introduction of predictive maintenance through an analysis of operating conditions and system health. The techniques disclosed herein utilize monitor rules to predict future trends in a Hybrid Cloud system to anticipate and address potential issues. The disclosed techniques address several technical problems associated with Hybrid Cloud systems. For example, the disclosed techniques address inefficiencies and problems associated with existing Hybrid Cloud systems which rely upon traditional reactive support methods. As described in more detail below, the disclosed techniques can also improve security by detecting potential vulnerabilities before a failure, and save computing resources, such as processing cycles, memory resources, and networking resources, by only transmitting select status data at select times to generate new iterations of monitor rules rather than full system logs and telemetry data.

Traditional systems have services running solely on a centralized server. Since these traditional systems do not have bandwidth or power constraints, more direct methods for detecting issues are more readily available. However, since Hybrid Cloud systems include a centralized server at a datacenter and one or more on-prem servers that may be physically and communicatively isolated from the centralized server, malfunctions are more difficult to detect, and moreover, more difficult to predict. In some situations, device and software failures may be undetected until they cause significant disruption to server operations. Traditional methods used for detecting and predicting failures in traditional systems cannot be used in Hybrid Cloud systems given the divided architecture and connectivity constraints. Such tactics can lead to server downtime and an increased need for extensive engineering support.

The predictive maintenance features disclosed herein provide several benefits (e.g., technical effects) that enable Hybrid Cloud systems to effectively predict and proactively resolve potential malfunctions at on-prem servers. For instance, a system can generate monitor rules based on system logs and telemetry data gathered from previous on-prem server malfunctions. Communication of the logs enables the system to anticipate potential malfunctions and take action to prevent them. The system can also adjust the monitor rules based on diagnostic data received from the on-prem servers. By communicating the diagnostic data instead of the log data at select stages, a system can minimize the use of bandwidth while still enabling a system to continually tune monitoring rules that are used to anticipate potential malfunctions.

Predictive maintenance for Hybrid Cloud systems changes the entire user experience compared to traditional Hybrid Cloud systems. This is possible because the disclosed techniques overcome the architectural limitations of Hybrid Cloud systems, which may not always allow constant monitoring. By enabling predictive maintenance through a tailored set of monitor rules, on-prem servers can anticipate malfunctions thus avoiding the significant downtime and cost of typical maintenance methods. In this way, predictive maintenance allows Hybrid Cloud systems to take advantage of the features of always-connected systems while still fulfilling the security, performance, or physical requirements that necessitate a Hybrid Cloud system.

To illustrate aspects of the present disclosure, consider an example scenario involving a cruise liner utilizing a Hybrid Cloud system. In this example, a cruise liner manages a ship having an on-prem server that is in communication with a centralized server through a limited network connection. The network connection may include a high-speed connection while the ship is docked and a limited satellite connection when the ship is at sea. Since the ship may be at sea for extended periods of time, the on-prem server may only connect to the centralized server intermittently. This type of arrangement make it impossible for a service provider to constantly monitor the health of the on-prem server. By employing the predictive maintenance techniques described herein, the on-prem server deployed aboard the ship can receive a set of monitor rules from the centralized server when a stable network connection is available, such as while docked in port. When disconnected from the centralized server, such as during a voyage, the on-prem server can employ the monitor rules to proactively resolve issues without incurring significant downtime nor require intervention by the service provider. In addition, once the monitor rules are received by the on-prem server, only select diagnostic data needs to be transmitted to update or generate new iterations of the monitor rules. This approach can utilize a low-bandwidth connection, e.g., a satellite connection, and reduce the amount of network traffic.

In another example of a technical effect of the present disclosure, the predictive maintenance techniques disclosed herein improve the performance of Hybrid Cloud systems. This is possible due to the increased autonomy afforded an on-prem server even when a constant connection to the centralized server is available. By predicting malfunctions at the on-prem server, the hybrid system can resolve issues without impacting regular operations. For example, by employing monitor rules at the on-prem server, issues that may arise out of hardware or software malfunctions are anticipated and resolved prior to any additional performance degradation thereby ensuring the system is always performing at its best. In addition, as discussed above, since only select diagnostic data regarding the monitor rules is transmitted to the centralized server, network resources are conserved while also protecting sensitive information stored at the on-prem server. This preserves the autonomy of sensitive data that may be stored on an on-prem server, such as financial information, personal information, or trade secrets. FIGS. 1-6 illustrate an implementation of the Hybrid Cloud system with predictive maintenance features and depict various operating states of the Hybrid Cloud system.

Referring now to FIG. 1, aspects of Hybrid Cloud system with predictive maintenance features are shown and described below. For illustrative purposes, the Hybrid Cloud system is also referred to herein simply as a "hybrid system 100." In addition, the centralized server is also referred to herein as a "primary server 150." In this example, the hybrid system 100 comprises a primary server 150 and an on-prem server 101. An on-prem server is a computing system that is deployed at a remote location from the primary server 150. In some embodiments, the network connection 160 between the on-prem server and the primary server may be intermittently available or limited by certain constraints such as bandwidth or latency.

In some implementations, a diagnostic agent 104 at the on-prem server 101 analyzes system data 103 defining a set of operating conditions 103A. In this example, the operating conditions define the data rate of a hardware storage device and the failure rate of an input/output (I/O) device. The diagnostic agent compares the system data to a set of predetermined conditions 104A defining a corresponding threshold for each operating condition. Although this example involves a failure rate, it can be appreciated that any other operating condition or performance metric of a hardware or software component can be utilized.

The diagnostic agent can then detect that an operating condition meets one or more of the predetermined conditions indicating a malfunction or a potential malfunction associated with the on-prem system. For example, the diagnostic agent can detect that an I/O device failure rate exceeds a certain threshold. In response, the diagnostic agent can gather system logs and telemetry data to generate log data 110. The log data can define the operating conditions associated with the detection of the predetermined condition 104A to provide a snapshot of the system conditions at the detection of the predetermined condition. For example, the log data can define the failure rate of an I/O device, and an identifier for associated hardware devices.

Figure 2:
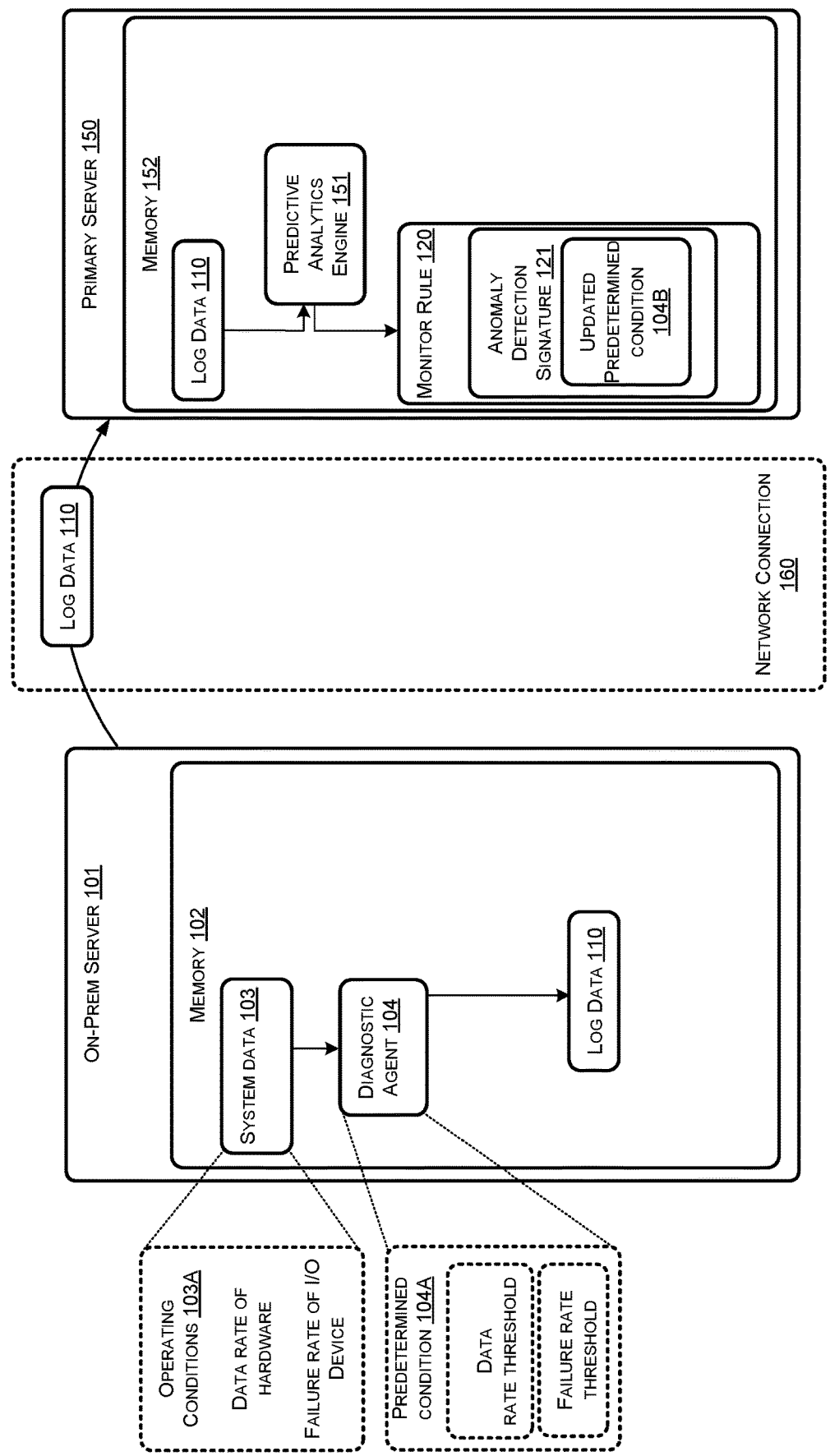
FIG. 2 illustrates aspects of a Hybrid Cloud system in a first state of a process of predictive maintenance.

As shown in FIG. 2, the log data 110 is communicated using the network connection 160 from the on-prem server to the primary server 150. Aboard a cruise liner, for example, log data can be transmitted upon arriving in port when a network connection becomes available. Upon receiving the log data, the predictive analytics engine 151 at the primary server can generate one or more monitor rules 120 based on the log data. A monitor rule can include an anomaly detection signature 121 for detecting potential malfunctions at the on-prem server. This is achieved by the inclusion of an updated predetermined condition 104B that is tailored to the unique configuration of the on-prem server. An updated predetermined condition 104B can include, for instance, a modified threshold for the I/O device failure rate. As described below with respect to FIGS. 3-6, by tailoring monitor rules 120 to the on-prem server, the on-prem server can more accurately predict potential malfunctions before they occur. Such functionality can be vital for on-prem servers, such as those aboard the cruise liner, that are physically and communicatively isolated from the services and infrastructure of the primary server.

Figure 3:
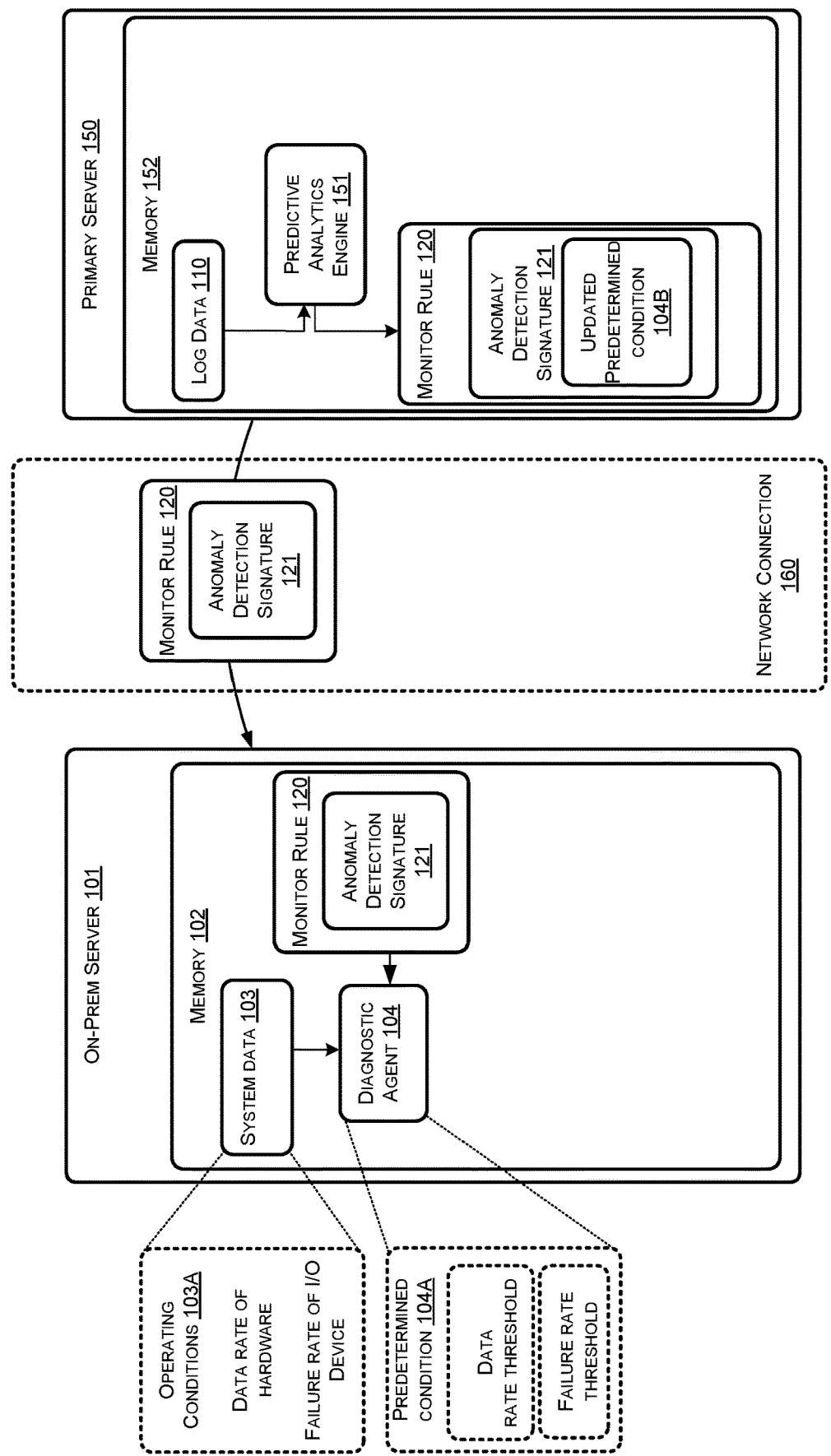
FIG. 3 illustrates aspects of a Hybrid Cloud system in a second state of a process of predictive maintenance.

Referring now to FIG. 3, the one or more monitor rules 120 are communicated from the primary server 150 to the on-prem server 101. Upon receiving the monitor rules, the on-prem server can utilize the monitor rules to analyze the operating conditions 103A defined by the system data 103. The operating conditions defined by the system data can be compared to the thresholds of the updated predetermined conditions in the anomaly detection signature 121. Continuing with the cruise liner example, the ship may set off for another voyage after the on-prem server receives the monitor rules. At this point, the on-prem server may be disconnected from the primary server and is thus independently monitoring the on-prem server utilizing the monitor rules.

Figure 4:
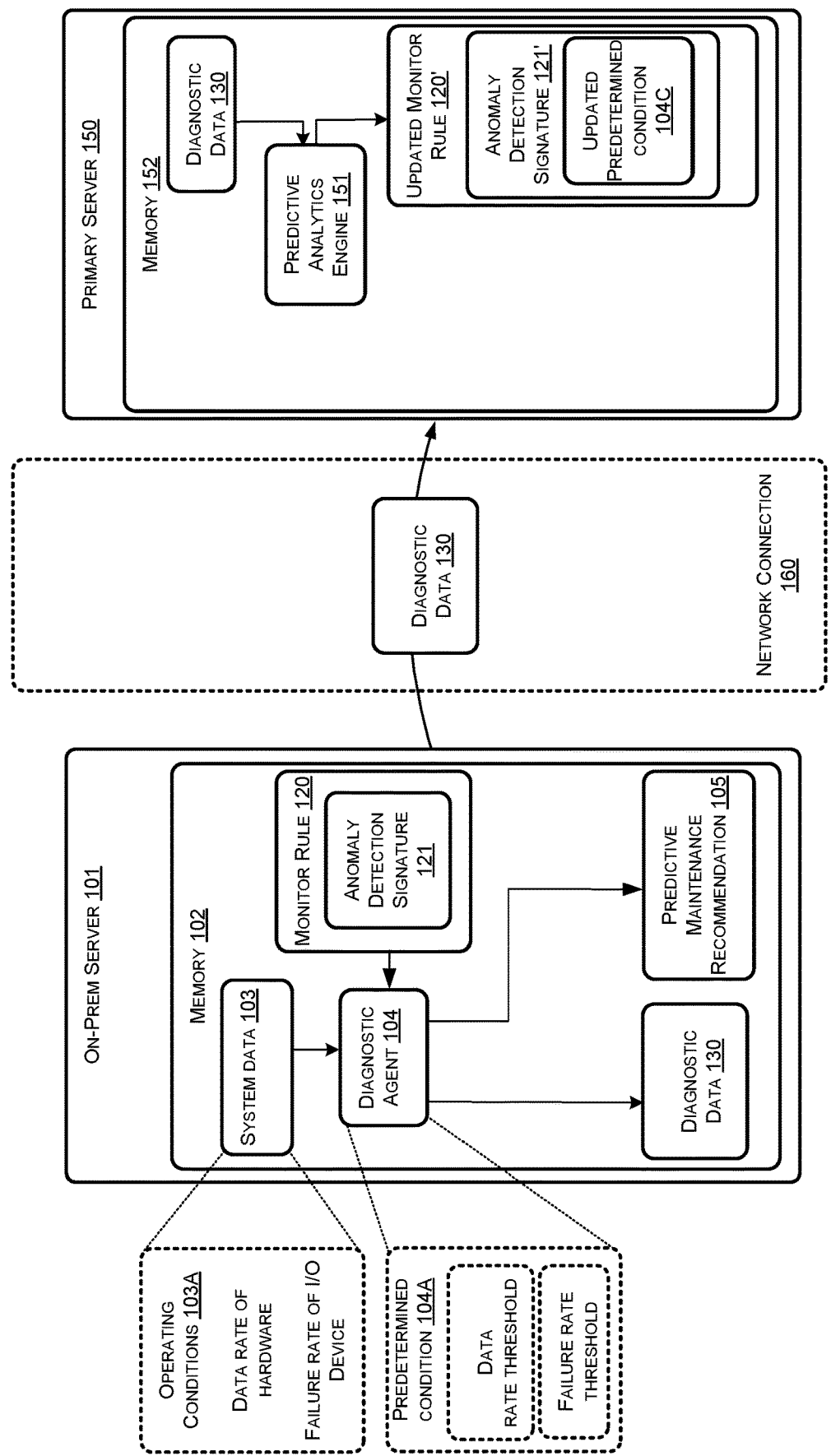
FIG. 4 illustrates aspects of a Hybrid Cloud system in a third state of a process of predictive maintenance.

Turning now to FIG. 4, the comparison of the operating conditions to the updated predetermined conditions can detect an anomaly. In other words, the operating conditions of the on-prem server 101 satisfy the updated predetermined conditions of the anomaly detection signature indicating that a potential malfunction may occur soon. This may occur, for instance, when the on-prem server 101 detects a failure rate that exceeds the modified threshold for the I/O device failure rate generated for the anomaly detection signature 121. In response, the on-prem server can generate a predictive maintenance recommendation 105. The predictive maintenance recommendation can specify the anomaly, such as the current system operating conditions 103A that triggered the recommendation. The recommendation can also describe a set of actions for proactively resolving the anomaly. For instance, upon detecting that the data transfer rate of a hardware memory device has fallen to a certain threshold, the system can generate a recommendation to replace the potentially faulty device before it fails. It should be appreciated that a hardware memory device can be a hard drive, a solid-state drive, an optical memory device and the like.

In addition, the diagnostic agent 104 can generate diagnostic data 130 defining the operating conditions captured during the detection of the anomaly. It should be noted that the diagnostic data captured during the anomaly detection is different in nature from the log data 110 generated above. While the log data described the system operating conditions 103A upon detection of the predetermined condition 104A, the diagnostic data describes specific operating conditions related to the detection of a particular anomaly. As such, the diagnostic data is significantly smaller in size than the log data resulting in reduced network traffic when communicating with the primary server. Upon receiving the diagnostic data, the primary server can use the diagnostic data to adjust the updated predetermined conditions 104C and generate an updated monitor rule 120' with a new anomaly detection signature 121' and updated predetermined conditions 104C.

Figure 5:
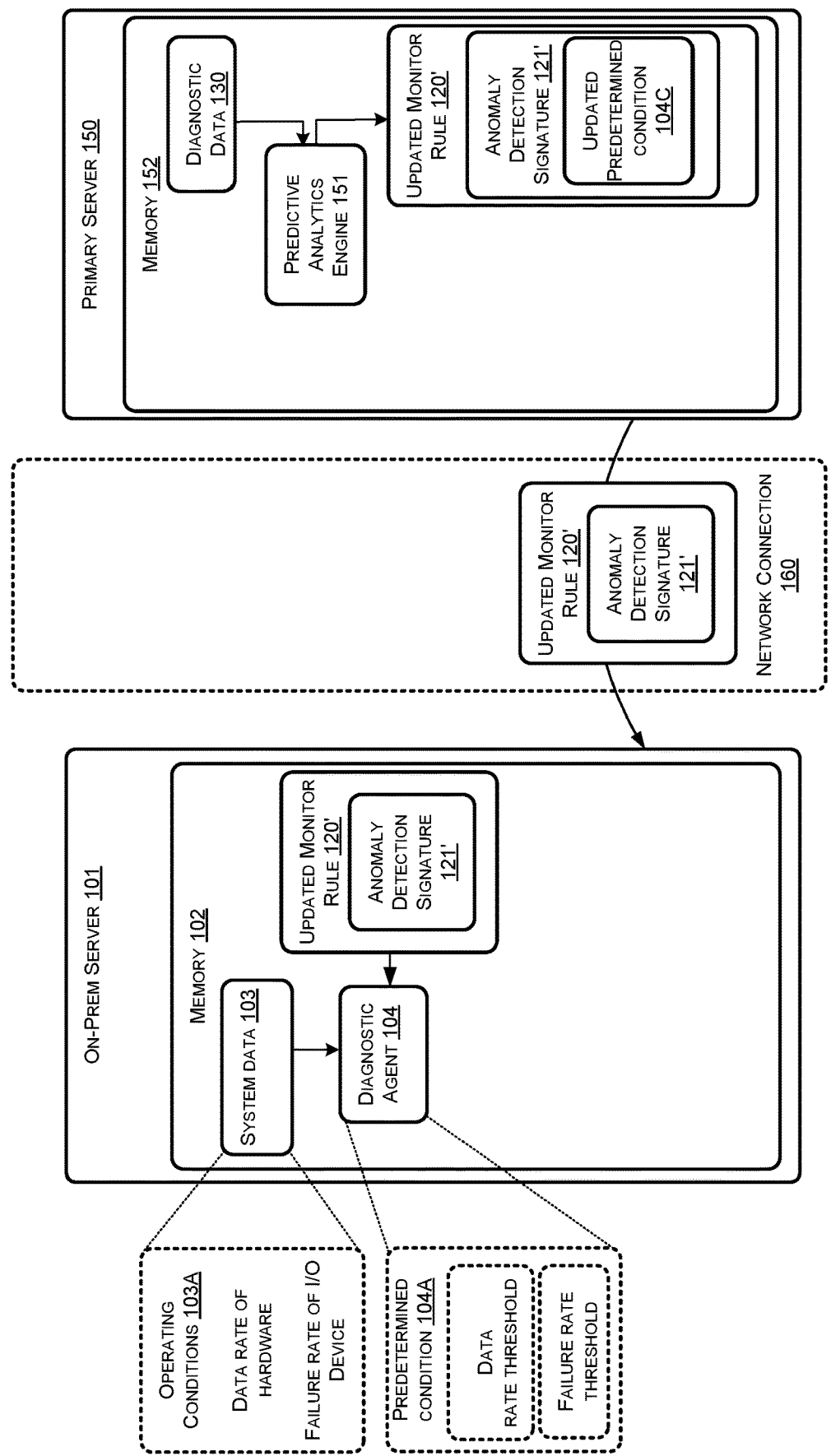
FIG. 5 illustrates aspects of a Hybrid Cloud system in a fourth state of a process of enabling predictive maintenance.

As shown in FIG. 5, the updated monitor rule 120' is transmitted to the on-prem server by the primary server 150. The updated monitor rule replaces the original monitor rule 120 at the on-prem server for further detecting anomalies. The updated anomaly detection signature 121', having been generated based on the diagnostic data 130 from the previous anomaly, is now even more tailored to detecting similar situations. Therefore, the updated monitor rule can now predict potential malfunctions more accurately and take proactive action sooner. For instance, using the memory device example from above, the updated monitor rule can consider the faltering data rate of the previous anomaly and more accurately predict when a future failure may occur. In a specific example, a monitor rule 120 may have specified a threshold data rate of 600 MB/s to indicate a potentially faulty drive. After employing the monitor rule, the diagnostic data 130 may indicate that the threshold may be too low resulting in occasional drive failures. In response, the updated monitor rule 120' may have a raised the threshold data rate of 700 MB/s. In this example, the system can recommend replacing the drive sooner and preempt performance degradation.

By utilizing monitor rules to predict potential system failures, an on-prem server can avoid unexpected downtime and mitigate impact on critical applications. Upon detecting anomalies, repairs can be performed quickly to maintain peak performance. In addition, if more significant maintenance must be performed, system downtime can be scheduled in advance and the on-prem server taken offline in a controlled manner. Thus, the predictive maintenance features described herein improve performance and conserve computing resources in Hybrid Cloud systems.

Figure 6:
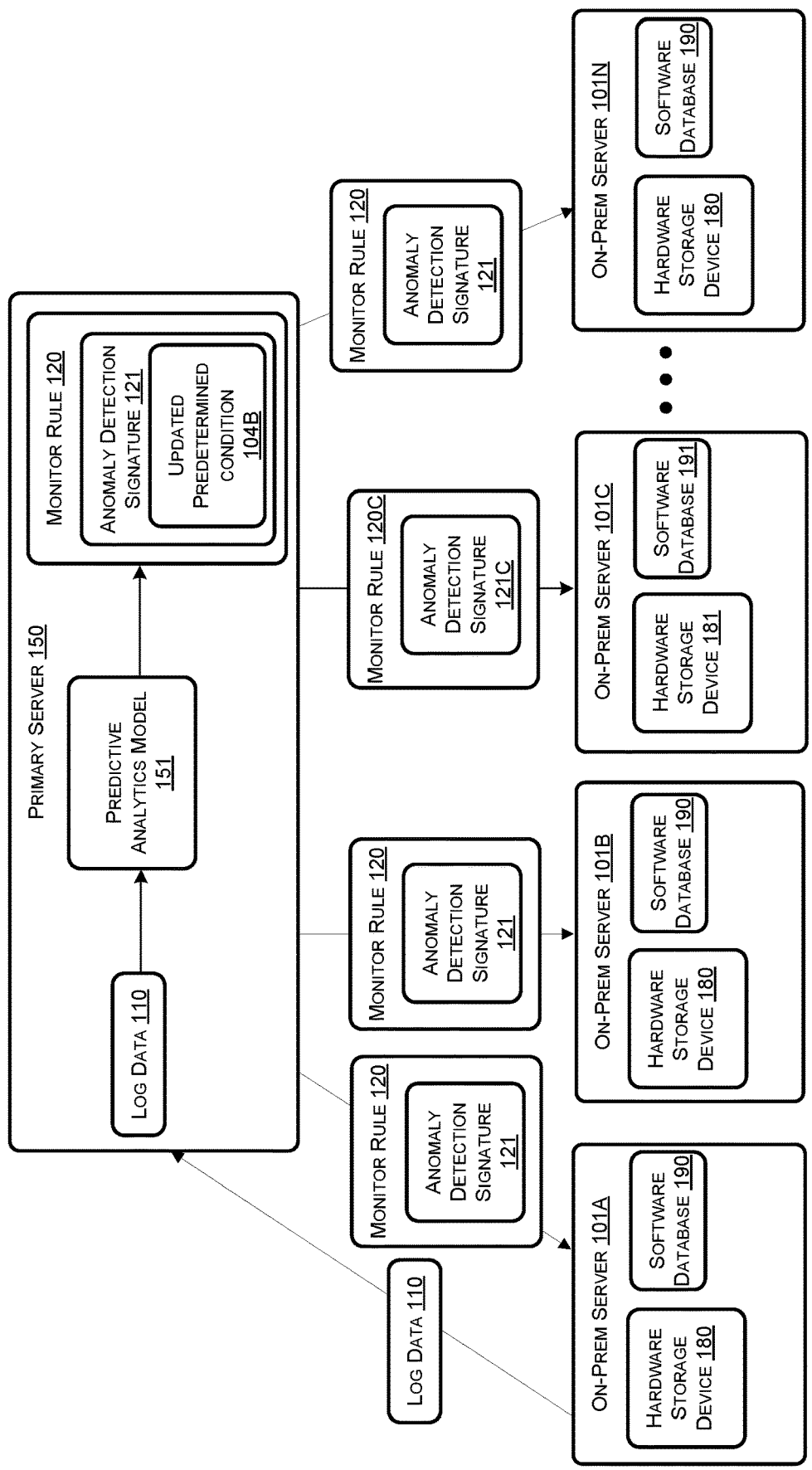
FIG. 6 shows an example of a Hybrid Cloud system comprising a primary server and a plurality of on-prem servers.

Referring now to FIG. 6, another example implementation of a Hybrid Cloud system with predictive maintenance features is shown and described. In this example, the Hybrid Cloud system includes a plurality of on-prem servers 101A-101N communicating with a single primary server 150. In some embodiments, individual on-prem servers of the plurality of on-prem servers are configured to receive monitor rules from the primary server. Like the examples discussed above, a first on-prem server 101A can detect that an error has occurred. In response, the first on-prem server can generate log data 110 and communicate the log data to the primary server. The primary server can generate a monitor rule 120 using the log data and communicate the monitor rule to the first on-prem server.

In some embodiments, the primary server, having a connection to the each of the plurality of on-prem servers, can determine that the monitor rule 120 is applicable to a second on-prem server 101B and an Nth on-prem server 101N. Upon determining that the monitor rule may be useful to on-prem servers 101B and 101N, the primary server can send the monitor rule to the additional on-prem servers. Continuing with the storage device example from above, the primary server can detect that additional on-prem servers make use of the same storage devices 180 as the first on-prem server 101A. Naturally, the monitor rule tailored to the equipment of the first on-prem server would be useful to the other on-prem servers that utilize the same equipment. Thus, the primary server can send the monitor rule to multiple on-prem servers without requiring transmission of log data from every on-prem server. Conversely, a third on-prem server 101C which utilizes a different hardware storage device 181, does not receive the monitor rule 120 as it is not applicable the equipment of on-prem server 101C. Instead, on-prem server 101C may receive a different monitor rule 120C that is tailored to the configuration of on-prem server 101C.

In another illustrative example, a monitor rule may be tailored to the software configuration of a particular on-prem server. In this example, the monitor rule 120 can be generated based on log data 110 for a software database 190 at the first on-prem server 101A. On-prem servers 101B and 101N, having similar software databases 190, may also receive the monitor rule. In addition, since on-prem server 101C is configured with a different software database 191, on-prem server 101C does not receive the monitor rule. These examples are provided for illustrative purposes and are not to be construed as limiting. It should be appreciated that any combination of factors can be utilized to determine that an on-prem server is eligible to receive a monitor rule.

Figure 7:
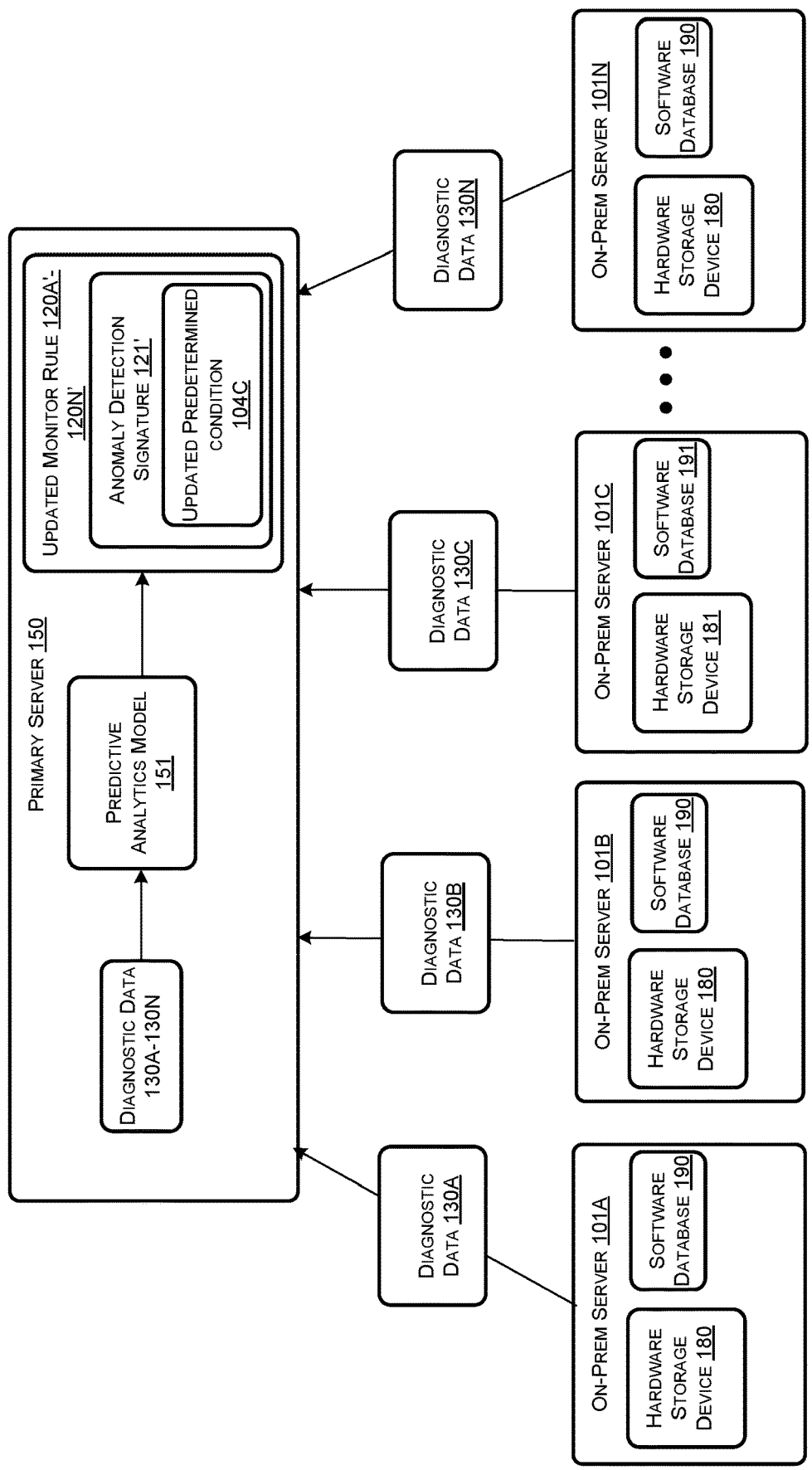
FIG. 7 illustrates aspects of the Hybrid Cloud system comprising a primary server and a plurality of on-prem servers in a first state of a process of predictive maintenance.

Turning now to FIG. 7, each of the on-prem servers 101A-101N have utilized a monitor rule 120 or 120C to detect an anomaly such as in the examples described above with respect to FIG. 4. In response to detecting an anomaly, each on-prem server has generated diagnostic data 130A-130N. In some configurations, the operating conditions of each on-prem server may diverge over time despite having similar hardware equipment 180 and software configurations 190. Thus, similar on-prem servers may generate different sets of diagnostic data. In an illustrative example, each on-prem server may be deployed on a different cruise liner. While deployed under similar circumstances, the operating conditions of each on-prem server may differ due to the specific behavior of passengers and crew utilizing the server among other various factors.

Figure 8:
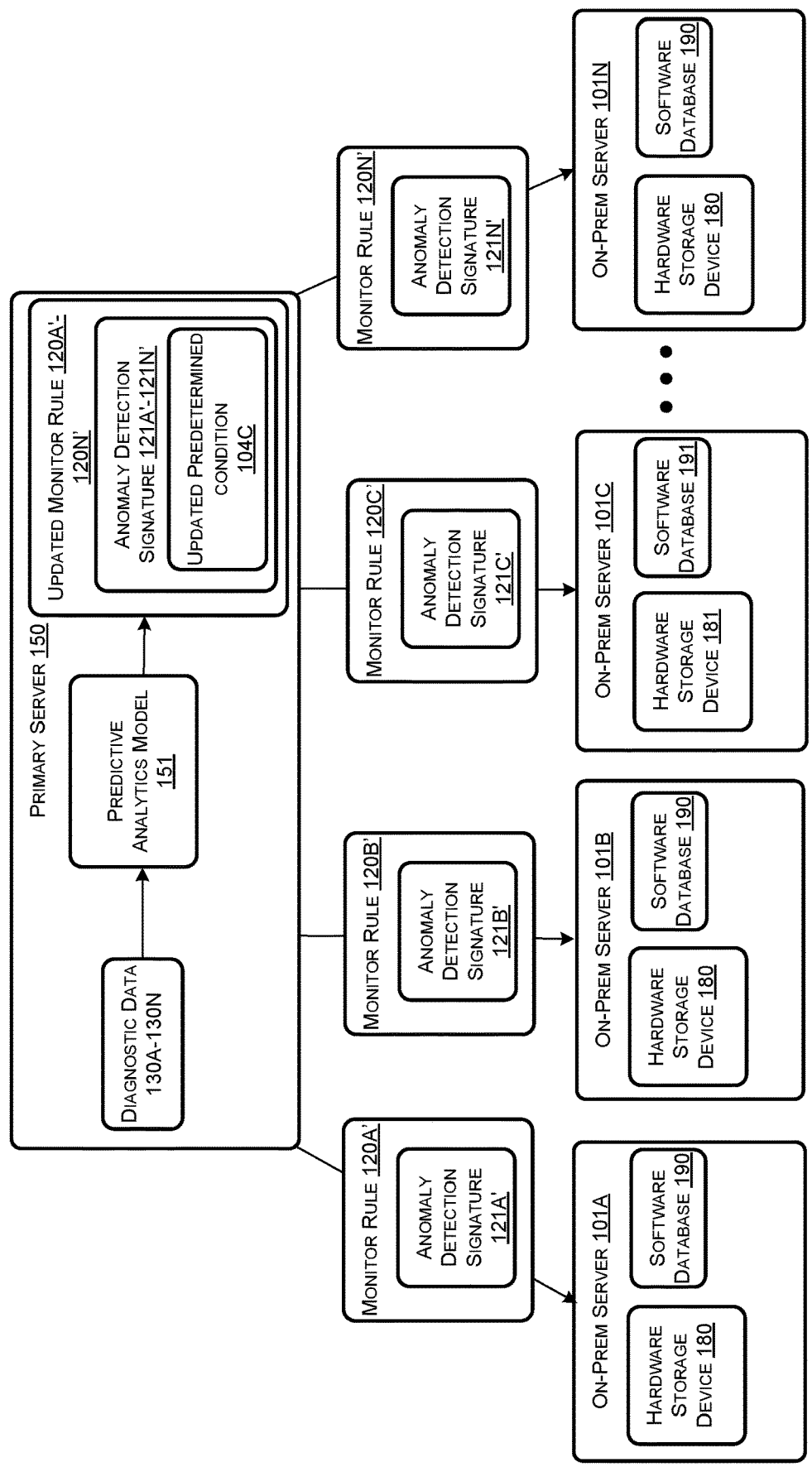
FIG. 8 illustrates aspects of the Hybrid Cloud system comprising a primary server and a plurality of on-prem servers in a second state of a process of predictive maintenance.

Referring to FIG. 8, upon receiving the diagnostic data 130A-130N from each on-prem server 101A-101N, the primary server 150 can generate one or more updated monitor rules 120A'-120N' each having an updated anomaly detection signature 121A'-121N'. Thus, each on-prem server receives an updated monitor rule that is tailored to its specific operating conditions. In addition, since on-prem servers 101B and 101N received monitor rule 120 as shown in FIG. 6, on-prem servers 101B and 101N are able to bypass the initial transmission of log data 110 thereby conserving significant network and computing resources.

Figure 9:
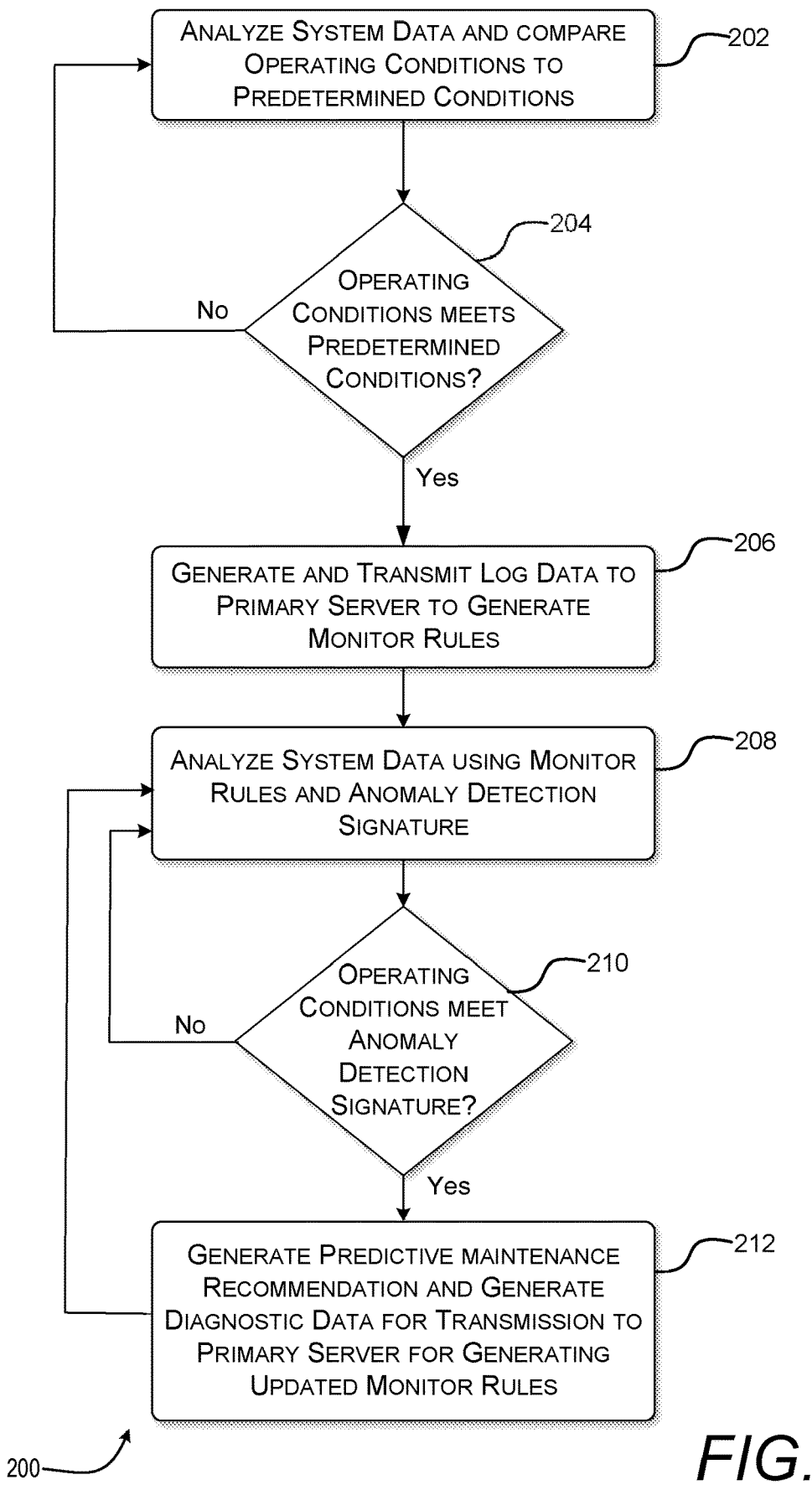
FIG. 9 is a flow diagram showing aspects of a routine for enabling the techniques disclosed herein.

Turning now to FIG. 9, aspects of a routine 200 for enabling predictive maintenance features in Hybrid Cloud systems are shown and described below. It should be understood that the operations of the methods disclosed herein are not presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 200 are described herein as being implemented, at least in part, by modules running the features disclosed herein can be a dynamically linked library (DLL), a statically linked library, functionality produced by an application programing interface (API), a compiled program, an interpreted program, a script or any other executable set of instructions. Data can be stored in a data structure in one or more memory components. Data can be retrieved from the data structure by addressing links or references to the data structure.

Although the following illustration refers to the components of the figures, it should be appreciated that the operations of the routine 200 may be also implemented in many other ways. For example, the routine 200 may be implemented, at least in part, by a processor of another remote computer or a local circuit. In addition, one or more of the operations of the routine 200 may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

With reference to FIG. 9, the routine 200 begins at operation 202 where the diagnostic agent 104 and/or other software agents receives, obtains, or otherwise accesses the system data 103 and analyzes the one or more operating conditions 103A defined by the system data. Operation 202 can involve comparing the one or more operating conditions with one or more predetermined conditions 104A defined by the diagnostic agent. The techniques disclosed herein can apply to any type of operating condition, including but not limited to a data rate of a hardware storage device, a failure rate of an I/O device, an error rate of a software database, or any other data that defines a performance metric for one or more system components.

Next, at operation 204, the diagnostic agent 104 and/or other agents can determine if one or more operating conditions 103A defined by the system data 103 meets one or more corresponding predetermined conditions 104A defined by the diagnostic agent. The diagnostic agent can utilize different types of criteria to determine if an operating condition meets a predetermined condition. For instance, a particular operating condition, such as a data rate of a hardware storage device, can meet a corresponding predetermined condition when the data rate falls below a data rate threshold. This allows the diagnostic data to detect that an error has occurred with the on-prem server 101. For example, a low data rate can indicate a failed storage device that requires replacement. If the diagnostic agent determines that one or more predetermined conditions are not met the system returns to operation 202 to continue analyzing the operating conditions. If the diagnostic agent determines that one or more predetermined conditions are met the system proceeds to operation 206.

Next, at operation 206, the diagnostic agent 104 and/or other agents can generate log data 110 defining a plurality of operating conditions at the on-prem server 101 associated with the one or more predetermined conditions 104A that were met by the one or more operating conditions 103A. The log data may comprise any suitable type of data defining the performance and operating state of the on-prem server. Operation 206 can further involve transmitting the log data to a primary server 150 for analysis by a predictive analytics engine 151 and/or other software components. The predictive analytics engine can then generate a monitor rule 120 based on the log data. The monitor rule can include an anomaly detection signature 121 comprising at least one updated predetermined condition 104B. In some configurations, the updated predetermined conditions may define adjusted thresholds to the same set of predetermined conditions 104A. In one example, predetermined conditions 104A can define a data rate threshold and a failure rate threshold. In this case, the updated predetermined conditions 104B can define an adjusted data rate threshold and an adjusted failure rate threshold. In some configurations, the monitor rules can be generated using machine learning techniques applied to an analysis of the log data. The machine learning techniques can be further utilized to generate the one or more adjustments to the predetermined conditions.

In some configurations, the updated predetermined conditions 104B can be a subset of the original predetermined conditions 104A. For instance, a monitor rule 120 may be tailored to detecting potential malfunctions in hardware storage devices. In this example, anomaly detection signature 121 may omit the failure rate threshold from the updated predetermined conditions 104B and include the data rate threshold.

In still more configurations, the updated predetermined conditions 104B can include operating condition thresholds not previously measured. Continuing with the example from above, a monitor rule 120 that is tailored to hardware storage devices may include an adjusted data rate threshold as well as a new condition such as a threshold storage device temperature. These examples are provided for illustrative purposes and are not to be construed as limiting. The present disclosure can involve any combination of these operating conditions and other operating conditions.

Moving to operation 208, the on-prem server 101 can receive the one or more monitor rules 120 from the primary server 150. Upon receiving the monitor rules, the on-prem server can replace the original predetermined conditions 104A with the updated predetermined conditions 104B of the monitor rules 120. At this point, the on-prem server can analyze the operating conditions 103A using the updated predetermined conditions to detect potential malfunctions before they happen.

Next, in operation 210, the diagnostic agent 104 can determine if one or more operating conditions meet one or more corresponding updated predetermined conditions 104B of the anomaly detection signature 121. In similar fashion to operation 204 above, the diagnostic agent can utilize different types of criteria to detect an anomaly by determining if one or more operating conditions meet the one or more updated predetermined conditions. As discussed above, the updated predetermined conditions may be the same set of the original operating conditions 103A, a subset of the original operating conditions, or include additional operating conditions. If the diagnostic agent determines that one or more updated predetermined conditions are not met the system returns to operation 208 to continue analyzing the operating conditions using the monitor rule. If the diagnostic agent determines that one or more updated predetermined conditions are met the system proceeds to operation 212.

At operation 212, the diagnostic agent 104 can generate a predictive maintenance recommendation 105. The predictive maintenance recommendation can describe the detected anomaly as well as proactive steps to resolve potential malfunctions. The performance recommendation can be presented using any suitable format such as a graphical user interface (GUI), a web site, an e-mail, or the like.

In some configurations, the on-prem server can automatically take action to resolve the potential issue. This is possible through an analysis of the predictive maintenance recommendation that may reveal that the proposed actions can be performed without human intervention. For instance, upon detecting an anomaly such as a threshold data rate of a hardware storage device, the on-prem system may recommend rebooting the faulty drive. In this case, the on-prem server may be configured to automatically perform the actions of predictive maintenance recommendation. These examples are provided for illustrative purposes and are not to be construed as limiting.

Furthermore, operation 212 can involve generating diagnostic data 130. The diagnostic data can define the specific operating conditions associated with the detection of the anomaly. As discussed above, the diagnostic data is different from the log data 110, being more specific in nature and thus much smaller in size. The on-prem server can transmit the diagnostic data to the primary server 150 for analysis by the predictive analytics engine 151. The predictive analytics engine can then generate an updated monitor rule 120' based on the diagnostic data. The updated monitor rule can include a new anomaly detection signature 121' having a set of updated predetermined conditions 104C. Thus, the new monitor rule is further tailored to the unique environment of the on-prem server and can detect anomalies more accurately. From operation 212, the system can return to operation 208 for further monitoring.

Figure 10:
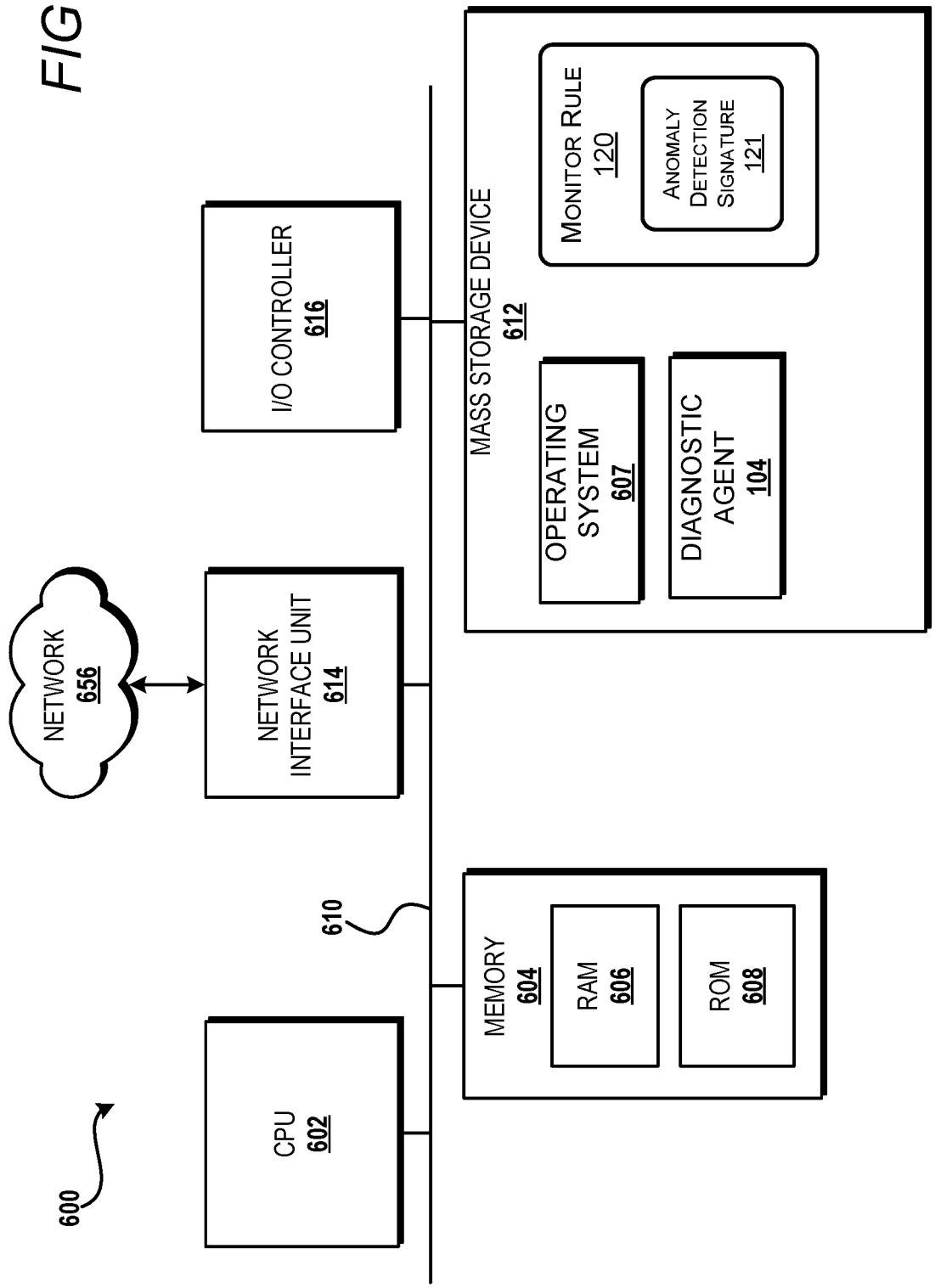
FIG. 10 is a computer architecture diagram illustrating an illustrative computer hardware and software architecture for a computing system capable of implementing aspects of the techniques and technologies presented herein.

FIG. 10 shows additional details of an example computer architecture 600 for a computer, such as the on-prem server 101 (FIG. 1), capable of executing the program components described herein. Thus, the computer architecture 600 illustrated in FIG. 10 illustrates an architecture for a server computer, a mobile phone, a PDA, a smart phone, a desktop computer, a netbook computer, a tablet computer, and/or a laptop computer. The computer architecture 600 may be utilized to execute any aspects of the software components presented herein.

The computer architecture 600 illustrated in FIG. 10 includes a central processing unit 602 ("CPU"), a system memory 604, including a random-access memory 606 ("RAM") and a read-only memory ("ROM") 608, and a system bus 610 that couples the memory 604 to the CPU 602. A basic input/output system containing the basic routines that help to transfer information between elements within the computer architecture 600, such as during startup, is stored in the ROM 608. The computer architecture 600 further includes a mass storage device 612 for storing an operating system 607, other data, and one or more applications, such as the analysis module 129. The mass storage device 612 can also store other items such as the document 110. As shown, a document can comprise at least one blob 609 that comprises at least one visual element, coordinates of the visual element for identifying a selectable region within a document, an address such as URL, and/or executable code for generating a URL.

The mass storage device 612 is connected to the CPU 602 through a mass storage controller (not shown) connected to the bus 610. The mass storage device 612 and its associated computer-readable media provide non-volatile storage for the computer architecture 600. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture 600.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media or a computer storage medium may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information, and which can be accessed by the computer architecture 800. For purposes of the claims, the phrase "non-transitory computer storage medium," "computer storage medium," "computer-readable storage medium" and variations thereof, does not include waves, signals, and/or other transitory and/or intangible communication media, per se.

According to various configurations, the computer architecture 600 may operate in a networked environment using logical connections to remote computers through the network 656 and/or another network (not shown). The computer architecture 600 may connect to the network 656 through a network interface unit 614 connected to the bus 610. It should be appreciated that the network interface unit 614 also may be utilized to connect to other types of networks and remote computer systems. The computer architecture 600 also may include an input/output controller 616 for receiving and processing input from a number of other devices, including a keyboard, mouse, or electronic stylus (not shown in FIG. 10). Similarly, the input/output controller 616 may provide output to a display screen, a printer, or other type of output device (also not shown in FIG. 10).

It should be appreciated that the software components described herein may, when loaded into the CPU 602 and executed, transform the CPU 602 and the overall computer architecture 600 from a general-purpose computing system into a special-purpose computing system customized to facilitate the functionality presented herein. The CPU 602 may be constructed from any number of transistors or other discrete circuit elements, which may individually or collectively assume any number of states. More specifically, the CPU 602 may operate as a finite-state machine, in response to executable instructions contained within the software modules disclosed herein. These computer-executable instructions may transform the CPU 602 by specifying how the CPU 602 transitions between states, thereby transforming the transistors or other discrete hardware elements constituting the CPU 602.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 600 in order to store and execute the software components presented herein. It also should be appreciated that the computer architecture 600 may include other types of computing devices, including hand-held computers, embedded computer systems, personal digital assistants, and other types of computing devices known to those skilled in the art. It is also contemplated that the computer architecture 600 may not include all of the components shown in FIG. 10, may include other components that are not explicitly shown in FIG. 10, or may utilize an architecture completely different than that shown in FIG. 10.

Figure 11:
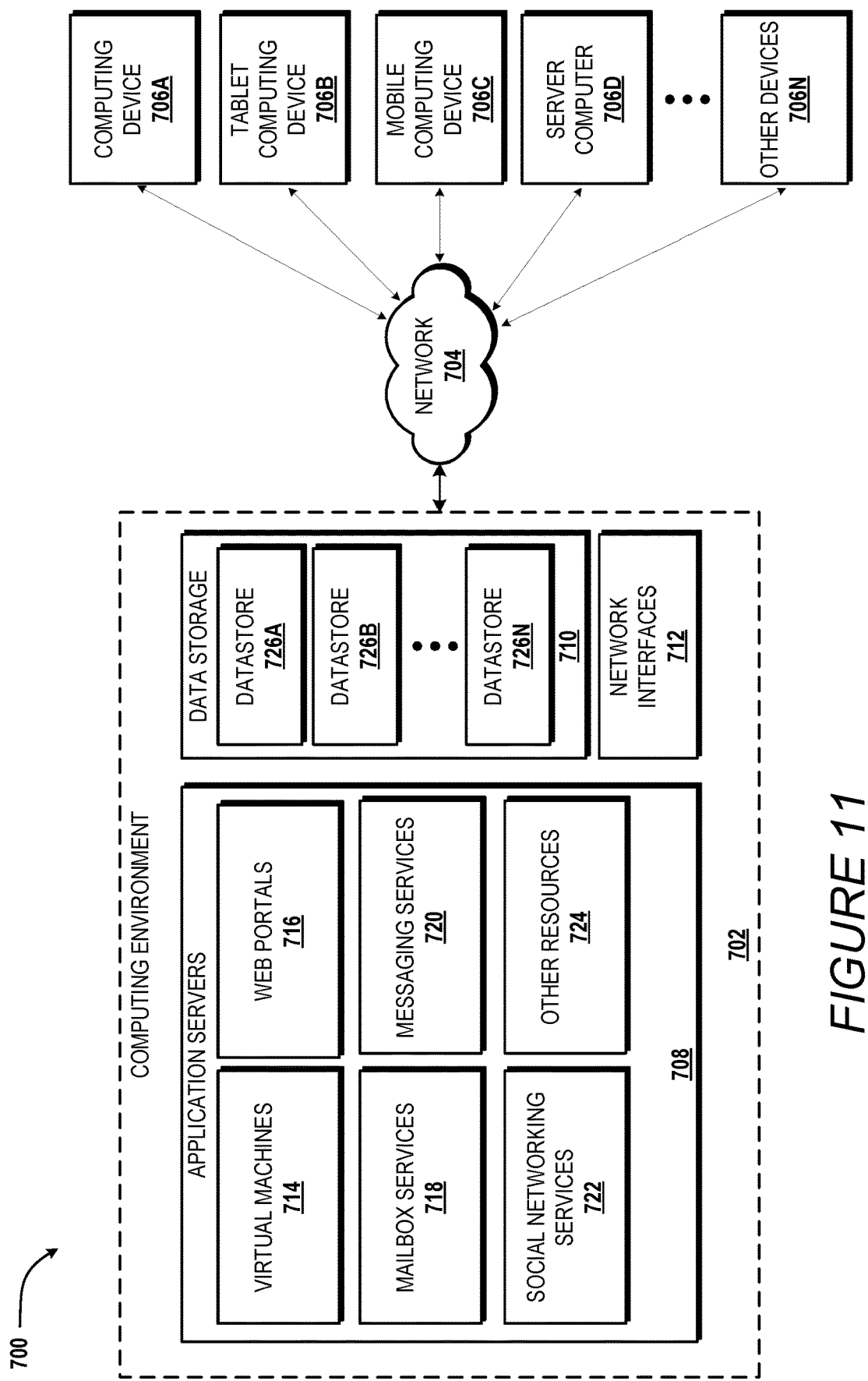
FIG. 11 is a diagram illustrating a distributed computing environment capable of implementing aspects of the techniques and technologies presented herein.

FIG. 11 depicts an illustrative distributed computing environment 700 capable of executing the software components described herein. Thus, the distributed computing environment 700 illustrated in FIG. 11 can be utilized to execute any aspects of the software components presented herein. For example, the distributed computing environment 700 can be utilized to execute aspects of the software components described herein.

According to various implementations, the distributed computing environment 700 includes a computing environment 702 operating on, in communication with, or as part of the network 704. The network 704 may be or may include the network 656, described above with reference to FIG. 10. The network 704 also can include various access networks. One or more client devices 706A-706N (hereinafter referred to collectively and/or generically as "clients 706" and also referred to herein as computing devices 106) can communicate with the computing environment 702 via the network 704 and/or other connections (not illustrated in FIG. 10). In one illustrated configuration, the clients 706 include a computing device 706A such as a laptop computer, a desktop computer, or other computing device; a slate or tablet computing device ("tablet computing device") 706B; a mobile computing device 706C such as a mobile telephone, a smart phone, or other mobile computing device; a server computer 706D; and/or other devices 706N. It should be understood that any number of clients 706 can communicate with the computing environment 702. Two example computing architectures for the clients 706 are illustrated and described herein with reference to FIGS. 9 and 11. It should be understood that the illustrated clients 706 and computing architectures illustrated and described herein are illustrative and should not be construed as being limited in any way.

In the illustrated configuration, the computing environment 702 includes application servers 708, data storage 710, and one or more network interfaces 712. According to various implementations, the functionality of the application servers 708 can be provided by one or more server computers that are executing as part of, or in communication with, the network 704. The application servers 708 can host various services, virtual machines, portals, and/or other resources. In the illustrated configuration, the application servers 708 host one or more virtual machines 714 for hosting applications or other functionality. According to various implementations, the virtual machines 714 host one or more applications and/or software modules for enabling efficient testing disclosed herein. It should be understood that this configuration is illustrative and should not be construed as being limiting in any way. The application servers 708 also host or provide access to one or more portals, link pages, Web sites, and/or other information ("Web portals") 716.

According to various implementations, the application servers 708 also include one or more mailbox services 718 and one or more messaging services 720. The mailbox services 718 can include electronic mail ("email") services. The mailbox services 718 also can include various personal information management ("PIM") and presence services including, but not limited to, calendar services, contact management services, collaboration services, and/or other services. The messaging services 720 can include, but are not limited to, instant messaging services, chat services, forum services, and/or other communication services.

The application servers 708 also may include one or more social networking services 722. The social networking services 722 can include various social networking services including, but not limited to, services for sharing or posting status updates, instant messages, links, photos, videos, and/or other information; services for commenting or displaying interest in articles, products, blogs, or other resources; and/or other services. In some configurations, the social networking services 722 are provided by or include the FACEBOOK social networking service, the LINKEDIN professional networking service, the MYSPACE social networking service, the FOURSQUARE geographic networking service, the YAMMER office colleague networking service, and the like. In other configurations, the social networking services 722 are provided by other services, sites, and/or providers that may or may not be explicitly known as social networking providers. For example, some web sites allow users to interact with one another via email, chat services, and/or other means during various activities and/or contexts such as reading published articles, commenting on goods or services, publishing, collaboration, gaming, and the like. Examples of such services include, but are not limited to, the WINDOWS LIVE service and the XBOX LIVE service from Microsoft Corporation in Redmond, Wash. Other services are possible and are contemplated.

The social networking services 722 also can include commenting, blogging, and/or micro blogging services. Examples of such services include, but are not limited to, the YELP commenting service, the KUDZU review service, the OFFICETALK enterprise micro blogging service, the TWITTER messaging service, the GOOGLE BUZZ service, and/or other services. It should be appreciated that the above lists of services are not exhaustive and that numerous additional and/or alternative social networking services 722 are not mentioned herein for the sake of brevity. As such, the above configurations are illustrative, and should not be construed as being limited in any way. According to various implementations, the social networking services 722 may host one or more applications and/or software modules for providing the functionality described herein. For instance, any one of the application servers 708 may communicate or facilitate the functionality and features described herein. For instance, a social networking application, mail client, messaging client or a browser running on a phone or any other client 706 may communicate with a networking service 722 and facilitate the functionality, even in part, described above with respect to FIG. 11. Any device or service depicted herein can be used as a resource for supplemental data, including email servers, storage servers, etc.

As shown in FIG. 11, the application servers 708 also can host other services, applications, portals, and/or other resources ("other resources") 724. The other resources 724 can include, but are not limited to, document sharing, rendering or any other functionality. It thus can be appreciated that the computing environment 702 can provide integration of the concepts and technologies disclosed herein with various mailbox, messaging, social networking, and/or other services or resources.

As mentioned above, the computing environment 702 can include the data storage 710. According to various implementations, the functionality of the data storage 710 is provided by one or more databases operating on, or in communication with, the network 704. The functionality of the data storage 710 also can be provided by one or more server computers configured to host data for the computing environment 702. The data storage 710 can include, host, or provide one or more real or virtual datastores 726A-726N (hereinafter referred to collectively and/or generically as "datastores 726"). The datastores 726 are configured to host data used or created by the application servers 708 and/or other data. Although not illustrated in FIG. 11, the datastores 726 also can host or store web page documents, word documents, presentation documents, data structures, algorithms for execution by a recommendation engine, and/or other data utilized by any application program or another module. Aspects of the datastores 726 may be associated with a service for storing files.

The computing environment 702 can communicate with, or be accessed by, the network interfaces 712. The network interfaces 712 can include various types of network hardware and software for supporting communications between two or more computing devices including, but not limited to, the computing devices and the servers. It should be appreciated that the network interfaces 712 also may be utilized to connect to other types of networks and/or computer systems.

It should be understood that the distributed computing environment 700 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 700 provides the software functionality described herein as a service to the computing devices. It should be understood that the computing devices can include real or virtual machines including, but not limited to, server computers, web servers, personal computers, mobile computing devices, smart phones, and/or other devices. As such, various configurations of the concepts and technologies disclosed herein enable any device configured to access the distributed computing environment 700 to utilize the functionality described herein for providing the techniques disclosed herein, among other aspects. In one specific example, as summarized above, techniques described herein may be implemented, at least in part, by web browser application, which works in conjunction with the application servers 708 of FIG. 11.

Turning now to FIG. 12, an illustrative computing device architecture 800 for a computing device that is capable of executing various software components described herein for enabling the techniques disclosed herein. The computing device architecture 800 is applicable to computing devices that facilitate mobile computing due, in part, to form factor, wireless connectivity, and/or battery-powered operation. In some configurations, the computing devices include, but are not limited to, mobile telephones, tablet devices, slate devices, portable video game devices, and the like. The computing device architecture 800 is applicable to any of the computing devices shown in FIG. 1 and FIG. 11. Moreover, aspects of the computing device architecture 800 may be applicable to traditional desktop computers, portable computers (e.g., phones, laptops, notebooks, ultra-portables, and netbooks), server computers, and other computer systems, such as described herein with reference to FIG. 1 and FIG. 11. For example, the single touch and multi-touch aspects disclosed herein below may be applied to desktop computers that utilize a touchscreen or some other touch-enabled device, such as a touch-enabled track pad or touch-enabled mouse.

The computing device architecture 800 illustrated in FIG. 12 includes a processor 802, memory components 804, network connectivity components 806, sensor components 808, input/output components 810, and power components 812. In the illustrated configuration, the processor 802 is in communication with the memory components 804, the network connectivity components 806, the sensor components 808, the input/output ("I/O") components 810, and the power components 812. Although no connections are shown between the individuals components illustrated in FIG. 12, the components can interact to carry out device functions. In some configurations, the components are arranged so as to communicate via one or more busses (not shown).

The processor 802 includes a central processing unit ("CPU") configured to process data, execute computer-executable instructions of one or more application programs, and communicate with other components of the computing device architecture 800 in order to perform various functionality described herein. The processor 802 may be utilized to execute aspects of the software components presented herein and, particularly, those that utilize, at least in part, a touch-enabled input.

In some configurations, the processor 802 includes a graphics processing unit ("GPU") configured to accelerate operations performed by the CPU, including, but not limited to, operations performed by executing general-purpose scientific and/or engineering computing applications, as well as graphics-intensive computing applications such as high-resolution video (e.g., 720P, 1080P, and higher resolution), video games, three-dimensional ("3D") modeling applications, and the like. In some configurations, the processor 802 is configured to communicate with a discrete GPU (not shown). In any case, the CPU and GPU may be configured in accordance with a co-processing CPU/GPU computing model, wherein the sequential part of an application executes on the CPU and the computationally intensive part is accelerated by the GPU.

In some configurations, the processor 802 is, or is included in, a system-on-chip ("SoC") along with one or more of the other components described herein below. For example, the SoC may include the processor 802, a GPU, one or more of the network connectivity components 806, and one or more of the sensor components 808. In some configurations, the processor 802 is fabricated, in part, utilizing a package-on-package ("PoP") integrated circuit packaging technique. The processor 802 may be a single core or multi-core processor.

The processor 802 may be created in accordance with an ARM architecture, available for license from ARM HOLDINGS of Cambridge, United Kingdom. Alternatively, the processor 802 may be created in accordance with an x86 architecture, such as is available from INTEL CORPORATION of Mountain View, Calif. and others. In some configurations, the processor 802 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 804 include a random-access memory ("RAM") 814, a read-only memory ("ROM") 816, an integrated storage memory ("integrated storage") 818, and a removable storage memory ("removable storage") 820. In some configurations, the RAM 814 or a portion thereof, the ROM 816 or a portion thereof, and/or some combination of the RAM 814 and the ROM 816 is integrated in the processor 802. In some configurations, the ROM 816 is configured to store a firmware, an operating system or a portion thereof (e.g., operating system kernel), and/or a bootloader to load an operating system kernel from the integrated storage 818 and/or the removable storage 820.

The integrated storage 818 can include a solid-state memory, a hard disk, or a combination of solid-state memory and a hard disk. The integrated storage 818 may be soldered or otherwise connected to a logic board upon which the processor 802 and other components described herein also may be connected. As such, the integrated storage 818 is integrated in the computing device. The integrated storage 818 is configured to store an operating system or portions thereof, application programs, data, and other software components described herein.

The removable storage 820 can include a solid-state memory, a hard disk, or a combination of solid-state memory and a hard disk. In some configurations, the removable storage 820 is provided in lieu of the integrated storage 818. In other configurations, the removable storage 820 is provided as additional optional storage. In some configurations, the removable storage 820 is logically combined with the integrated storage 818 such that the total available storage is made available as a total combined storage capacity. In some configurations, the total combined capacity of the integrated storage 818 and the removable storage 820 is shown to a user instead of separate storage capacities for the integrated storage 818 and the removable storage 820.

The removable storage 820 is configured to be inserted into a removable storage memory slot (not shown) or other mechanism by which the removable storage 820 is inserted and secured to facilitate a connection over which the removable storage 820 can communicate with other components of the computing device, such as the processor 802. The removable storage 820 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 804 can store an operating system. According to various configurations, the operating system includes, but is not limited to WINDOWS MOBILE OS from Microsoft Corporation of Redmond, Wash., WINDOWS PHONE OS from Microsoft Corporation, WINDOWS from Microsoft Corporation, PALM WEBOS from Hewlett-Packard Company of Palo Alto, Calif., BLACKBERRY OS from Research In Motion Limited of Waterloo, Ontario, Canada, IOS from Apple Inc. of Cupertino, Calif., and ANDROID OS from Google Inc. of Mountain View, Calif. Other operating systems are contemplated.

The network connectivity components 806 include a wireless wide area network component ("WWAN component") 822, a wireless local area network component ("WLAN component") 824, and a wireless personal area network component ("WPAN component") 826. The network connectivity components 806 facilitate communications to and from the network 856 or another network, which may be a WWAN, a WLAN, or a WPAN. Although only the network 856 is illustrated, the network connectivity components 806 may facilitate simultaneous communication with multiple networks, including the network 604 of FIG. 10. For example, the network connectivity components 806 may facilitate simultaneous communications with multiple networks via one or more of a WWAN, a WLAN, or a WPAN.

The network 856 may be or may include a WWAN, such as a mobile telecommunications network utilizing one or more mobile telecommunications technologies to provide voice and/or data services to a computing device utilizing the computing device architecture 800 via the WWAN component 822. The mobile telecommunications technologies can include, but are not limited to, Global System for Mobile communications ("GSM"), Code Division Multiple Access ("CDMA") ONE, CDMA7000, Universal Mobile Telecommunications System ("UMTS"), Long Term Evolution ("LTE"), and Worldwide Interoperability for Microwave Access ("WiMAX"). Moreover, the network 856 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 856 may be configured to provide voice and/or data communications with any combination of the above technologies. The network 856 may be configured to or adapted to provide voice and/or data communications in accordance with future generation technologies.

In some configurations, the WWAN component 822 is configured to provide dual-multi-mode connectivity to the network 856. For example, the WWAN component 822 may be configured to provide connectivity to the network 856, wherein the network 856 provides service via GSM and UMTS technologies, or via some other combination of technologies. Alternatively, multiple WWAN components 822 may be utilized to perform such functionality, and/or provide additional functionality to support other non-compatible technologies (i.e., incapable of being supported by a single WWAN component). The WWAN component 822 may facilitate similar connectivity to multiple networks (e.g., a UMTS network and an LTE network).

The network 856 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 824 is configured to connect to the network 856 via the WI-FI access points. Such connections may be secured via various encryption technologies including, but not limited, WI-FI Protected Access ("WPA"), WPA2, Wired Equivalent Privacy ("WEP"), and the like.

The network 856 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 826 is configured to facilitate communications with other devices, such as peripherals, computers, or other computing devices via the WPAN.

The sensor components 808 include a magnetometer 828, an ambient light sensor 830, a proximity sensor 832, an accelerometer 834, a gyroscope 836, and a Global Positioning System sensor ("GPS sensor") 838. It is contemplated that other sensors, such as, but not limited to, temperature sensors or shock detection sensors, also may be incorporated in the computing device architecture 800.

The magnetometer 828 is configured to measure the strength and direction of a magnetic field. In some configurations the magnetometer 828 provides measurements to a compass application program stored within one of the memory components 804 in order to provide a user with accurate directions in a frame of reference including the cardinal directions, north, south, east, and west. Similar measurements may be provided to a navigation application program that includes a compass component. Other uses of measurements obtained by the magnetometer 828 are contemplated.

The ambient light sensor 830 is configured to measure ambient light. In some configurations, the ambient light sensor 830 provides measurements to an application program stored within one the memory components 804 in order to automatically adjust the brightness of a display (described below) to compensate for low-light and high-light environments. Other uses of measurements obtained by the ambient light sensor 830 are contemplated.

The proximity sensor 832 is configured to detect the presence of an object or thing in proximity to the computing device without direct contact. In some configurations, the proximity sensor 832 detects the presence of a user's body (e.g., the user's face) and provides this information to an application program stored within one of the memory components 804 that utilizes the proximity information to enable or disable some functionality of the computing device. For example, a telephone application program may automatically disable a touchscreen (described below) in response to receiving the proximity information so that the user's face does not inadvertently end a call or enable/disable other functionality within the telephone application program during the call. Other uses of proximity as detected by the proximity sensor 832 are contemplated.

The accelerometer 834 is configured to measure proper acceleration. In some configurations, output from the accelerometer 834 is used by an application program as an input mechanism to control some functionality of the application program. For example, the application program may be a video game in which a character, a portion thereof, or an object is moved or otherwise manipulated in response to input received via the accelerometer 834. In some configurations, output from the accelerometer 834 is provided to an application program for use in switching between landscape and portrait modes, calculating coordinate acceleration, or detecting a fall. Other uses of the accelerometer 834 are contemplated.

The gyroscope 836 is configured to measure and maintain orientation. In some configurations, output from the gyroscope 836 is used by an application program as an input mechanism to control some functionality of the application program. For example, the gyroscope 836 can be used for accurate recognition of movement within a 3D environment of a video game application or some other application. In some configurations, an application program utilizes output from the gyroscope 836 and the accelerometer 834 to enhance control of some functionality of the application program. Other uses of the gyroscope 836 are contemplated.

The GPS sensor 838 is configured to receive signals from GPS satellites for use in calculating a location. The location calculated by the GPS sensor 838 may be used by any application program that requires or benefits from location information. For example, the location calculated by the GPS sensor 838 may be used with a navigation application program to provide directions from the location to a destination or directions from the destination to the location. Moreover, the GPS sensor 838 may be used to provide location information to an external location-based service, such as E911 service. The GPS sensor 838 may obtain location information generated via WI-FI, WIMAX, and/or cellular triangulation techniques utilizing one or more of the network connectivity components 806 to aid the GPS sensor 838 in obtaining a location fix. The GPS sensor 838 may also be used in Assisted GPS ("A-GPS") systems. The GPS sensor 838 can also operate in conjunction with other components, such as the processor 802, to generate positioning data for the computing device 800.

The I/O components 810 include a display 840, a touchscreen 842, a data I/O interface component ("data I/O") 844, an audio I/O interface component ("audio I/O") 846, a video I/O interface component ("video I/O") 848, and a camera 850. In some configurations, the display 840 and the touchscreen 842 are combined. In some configurations two or more of the data I/O component 844, the audio I/O component 846, and the video I/O component 848 are combined. The I/O components 810 may include discrete processors configured to support the various interface described below, or may include processing functionality built-in to the processor 802.

The display 840 is an output device configured to present information in a visual form. In particular, the display 840 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 840 is a liquid crystal display ("LCD") utilizing any active or passive matrix technology and any backlighting technology (if used). In some configurations, the display 840 is an organic light emitting diode ("OLED") display. Other display types are contemplated.

The touchscreen 842, also referred to herein as a "touch-enabled screen," is an input device configured to detect the presence and location of a touch. The touchscreen 842 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some configurations, the touchscreen 842 is incorporated on top of the display 840 as a transparent layer to enable a user to use one or more touches to interact with objects or other information presented on the display 840. In other configurations, the touchscreen 842 is a touch pad incorporated on a surface of the computing device that does not include the display 840. For example, the computing device may have a touchscreen incorporated on top of the display 840 and a touch pad on a surface opposite the display 840.

In some configurations, the touchscreen 842 is a single-touch touchscreen. In other configurations, the touchscreen 842 is a multi-touch touchscreen. In some configurations, the touchscreen 842 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures may be implemented in software for use with the touchscreen 842. As such, a developer may create gestures that are specific to a particular application program.

In some configurations, the touchscreen 842 supports a tap gesture in which a user taps the touchscreen 842 once on an item presented on the display 840. The tap gesture may be used for various reasons including, but not limited to, opening or launching whatever the user taps. In some configurations, the touchscreen 842 supports a double tap gesture in which a user taps the touchscreen 842 twice on an item presented on the display 840. The double tap gesture may be used for various reasons including, but not limited to, zooming in or zooming out in stages. In some configurations, the touchscreen 842 supports a tap and hold gesture in which a user taps the touchscreen 842 and maintains contact for at least a pre-defined time. The tap and hold gesture may be used for various reasons including, but not limited to, opening a context-specific menu.

In some configurations, the touchscreen 842 supports a pan gesture in which a user places a finger on the touchscreen 842 and maintains contact with the touchscreen 842 while moving the finger on the touchscreen 842. The pan gesture may be used for various reasons including, but not limited to, moving through screens, images, or menus at a controlled rate. Multiple finger pan gestures are also contemplated. In some configurations, the touchscreen 842 supports a flick gesture in which a user swipes a finger in the direction the user wants the screen to move. The flick gesture may be used for various reasons including, but not limited to, scrolling horizontally or vertically through menus or pages. In some configurations, the touchscreen 842 supports a pinch and stretch gesture in which a user makes a pinching motion with two fingers (e.g., thumb and forefinger) on the touchscreen 842 or moves the two fingers apart. The pinch and stretch gesture may be used for various reasons including, but not limited to, zooming gradually in or out of a web site, map, or picture.

Although the above gestures have been described with reference to the use of one or more fingers for performing the gestures, other appendages such as toes or objects such as styluses may be used to interact with the touchscreen 842. As such, the above gestures should be understood as being illustrative and should not be construed as being limiting in any way.

The data I/O interface component 844 is configured to facilitate input of data to the computing device and output of data from the computing device. In some configurations, the data I/O interface component 844 includes a connector configured to provide wired connectivity between the computing device and a computer system, for example, for synchronization operation purposes. The connector may be a proprietary connector or a standardized connector such as USB, micro-USB, mini-USB, or the like. In some configurations, the connector is a dock connector for docking the computing device with another device such as a docking station, audio device (e.g., a digital music player), or video device.

The audio I/O interface component 846 is configured to provide audio input and/or output capabilities to the computing device. In some configurations, the audio I/O interface component 846 includes a microphone configured to collect audio signals. In some configurations, the audio I/O interface component 846 includes a headphone jack configured to provide connectivity for headphones or other external speakers. In some configurations, the audio I/O interface component 846 includes a speaker for the output of audio signals. In some configurations, the audio I/O interface component 846 includes an optical audio cable out.

The video I/O interface component 848 is configured to provide video input and/or output capabilities to the computing device. In some configurations, the video I/O interface component 848 includes a video connector configured to receive video as input from another device (e.g., a video media player such as a DVD or BLURAY player) or send video as output to another device (e.g., a monitor, a television, or some other external display). In some configurations, the video I/O interface component 848 includes a High-Definition Multimedia Interface ("HDMI"), mini-HDMI, micro-HDMI, DisplayPort, or proprietary connector to input/output video content. In some configurations, the video I/O interface component 848 or portions thereof is combined with the audio I/O interface component 846 or portions thereof.

The camera 850 can be configured to capture still images and/or video. The camera 850 may utilize a charge coupled device ("CCD") or a complementary metal oxide semiconductor ("CMOS") image sensor to capture images. In some configurations, the camera 850 includes a flash to aid in taking pictures in low-light environments. Settings for the camera 850 may be implemented as hardware or software buttons.

Although not illustrated, one or more hardware buttons may also be included in the computing device architecture 800. The hardware buttons may be used for controlling some operational aspect of the computing device. The hardware buttons may be dedicated buttons or multi-use buttons. The hardware buttons may be mechanical or sensor-based.

The illustrated power components 812 include one or more batteries 852, which can be connected to a battery gauge 854. The batteries 852 may be rechargeable or disposable. Rechargeable battery types include, but are not limited to, lithium polymer, lithium ion, nickel cadmium, and nickel metal hydride. Each of the batteries 852 may be made of one or more cells.

The battery gauge 854 can be configured to measure battery parameters such as current, voltage, and temperature. In some configurations, the battery gauge 854 is configured to measure the effect of a battery's discharge rate, temperature, age and other factors to predict remaining life within a certain percentage of error. In some configurations, the battery gauge 854 provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

The power components 812 may also include a power connector, which may be combined with one or more of the aforementioned I/O components 810. The power components 812 may interface with an external power system or charging equipment via an I/O component.

The following clauses are to supplement the present disclosure.

Example Clause 1. A computer-implemented method to be performed by a computing system (101) for enabling predictive maintenance in a hybrid server environment (100), the method comprising: analyzing system data (103) defining at least one operating condition (103A) for detecting a predetermined condition (104A); in response to detecting the predetermined condition (104A), generating log data (110) defining the at least one operating condition (103A) associated with the predetermined condition (104A); communicating the log data (110) to a primary server (150), wherein the log data (110) causes the primary server (150) to generate one or more monitor rules (120) comprising at least one anomaly detection signature (121) comprising at least one updated predetermined condition (104B); receiving the one or more monitor rules (120) comprising at least one updated predetermined condition (104B); monitoring the at least one operating condition (103A) to detect an anomaly based on a comparison of the at least one operating condition (103A) and the at least one updated predetermined condition (104B); in response to detecting the anomaly based on the comparison of the at least one operating condition (103A) and the at least one updated predetermined condition (104B), generating a predictive maintenance recommendation (105) describing the anomaly and one or more actions for resolving the anomaly; generating diagnostic data (130) defining operating conditions (103A) captured during the detection of the anomaly; communicating the diagnostic data (130) to the primary server (150) causing the primary server (150) to adjust the at least one updated predetermined condition (104B) for generating an updated monitor rule (120'); and receiving the updated monitor rule (120'), wherein the updated monitor rule (120') replaces the one or more monitor rules (120) for use in detecting additional anomalies during operation of the computing system, the detection using the updated monitor rule (120') to enable predictive maintenance in a hybrid server environment (100).

Example Clause 2. The computer-implemented method of clause 1, wherein the at least one operating condition comprises a data rate of data exchanged with a hardware memory device, wherein the predetermined condition comprises at least one of a data rate threshold, wherein the detection of the predetermined condition comprises determining that the data rate falls below the data rate threshold.

Example Clause 3. The computer-implemented method of clauses 1 and 2, wherein the at least one operating condition comprises a failure rate of a hardware input/output (I/O) device, wherein the predetermined condition comprises at least one of a failure rate threshold, wherein the detection of the predetermined condition comprises determining that the failure rate exceeds the failure rate threshold.

Example Clause 4. The computer-implemented method of clauses 1 through 3, wherein the at least one operating condition comprises an error rate of a software database, wherein the predetermined condition comprises at least one of an error rate threshold, wherein the detection of the predetermined condition comprises determining that the error rate exceeds the failure rate threshold.

Example Clause 5. The computer-implemented method of clauses 1 through 4, wherein the anomaly detection signature comprises at least one updated predetermined condition, wherein the detection of the anomaly comprises determining that at least one operating condition meets the at least one updated predetermined condition of the anomaly detection signature.

Example Clause 6. The computer-implemented method of clauses 1 through 5, further comprising: determining that the monitor rule is applicable to one or more additional computing devices of a plurality of computing devices of the hybrid server environment; and in response to determining that the monitor rule is applicable to one or more computing devices, communicating the monitor rule to the one or more computing devices.

Example Clause 7. The computer-implemented method of clauses 1 through 6, wherein the additional computing devices excludes the computing device that generated the log data for generating the one or more monitor rules.

Example Clause 8. The computer-implemented method of clauses 1 through 7, wherein the additional computing devices share a common hardware configuration with the computing device that generated the log data.

Example Clause 9. A computing system (101) for enabling predictive maintenance features in a hybrid server environment, comprising: one or more processing units (802); and a non-transitory computer-readable storage medium (804) having encoded thereon computer-executable instructions to cause the one or more processing units (802) to: analyze system data (103) defining at least one operating condition (103A) for detecting a predetermined condition (104A); in response to detecting the predetermined condition (104A), generate log data (110) defining the at least one operating condition (103A) associated with the predetermined condition (104A); communicate the log data (110) to a primary server (150), wherein the log data (110) causes the primary server (150) to generate one or more monitor rules (120) comprising at least one anomaly detection signature (121) comprising at least one updated predetermined condition (104B); receive the one or more monitor rules (120) comprising at least one updated predetermined condition (104B); monitor the at least one operating condition (103A) to detect an anomaly based on a comparison of the at least one operating condition (103A) and the at least one updated predetermined condition (104B); in response to detecting the anomaly based on the comparison of the at least one operating condition (103A) and the at least one updated predetermined condition (104B), generate a predictive maintenance recommendation (105) describing the anomaly and one or more actions for resolving the anomaly; generate diagnostic data (130) defining operating conditions (103A) captured during the detection of the anomaly; communicate the diagnostic data (130) to the primary server (150) causing the primary server (150) to adjust the at least one updated predetermined condition (104B) for generating an updated monitor rule (120'); and receive the updated monitor rule (120'), wherein the updated monitor rule (120') replaces the one or more monitor rules (120) for use in detecting additional anomalies during operation of the computing system, the detection using the updated monitor rule (120') to enable predictive maintenance in a hybrid server environment (100).

Example Clause 10. The computing system of clause 9, wherein the at least one operating condition comprises a data rate of data exchanged with a hardware memory device, wherein the predetermined condition comprises at least one of a data rate threshold, wherein the detection of the predetermined condition comprises a determination that the data rate falls below the data rate threshold.

Example Clause 11. The computing system of clauses 9 and 10, wherein the at least one operating condition comprises a failure rate of a hardware input/output (I/O) device, wherein the predetermined condition comprises at least one of a failure rate threshold, wherein the detection of the predetermined condition comprises a determination that the failure rate exceeds the failure rate threshold.

Example Clause 12. The computing system of clauses 9 through 11, wherein the at least one operating condition comprises an error rate of a software database, wherein the predetermined condition comprises at least one of an error rate threshold, wherein the detection of the predetermined condition comprises a determination that the error rate exceeds the failure rate threshold.

Example Clause 13. The computing system of clauses 9 through 12, wherein the anomaly detection signature comprises at least one updated predetermined condition, wherein the detection of the anomaly comprises a determination that at least one operating condition meets the at least one updated predetermined condition of the anomaly detection signature.

Example Clause 14. The computing system of clauses 9 through 13, wherein the non-transitory computer-readable storage medium (804), having additional executable instructions encoded thereon, further causes the one or more processing units (802) to: determine that the monitor rule is applicable to one or more additional computing devices of a plurality of computing devices of the hybrid server environment; and in response to determining that the monitor rule is applicable to one or more computing devices, communicate the monitor rule to the one or more computing devices.

Example Clause 15. The computing system of clauses 9 through 14, wherein the additional computing devices excludes the computing device that generated the log data for generating the one or more monitor rules.

Example Clause 16. A computing system (150) for enabling proactive maintenance in a hybrid server environment (100) comprising: one or more processing units (802); and a non-transitory computer-readable storage medium (804) having encoded thereon computer-executable instructions to cause the one or more processing units (802) to: receive log data (110) from an on-prem server (101) defining at least one operating condition (103A) associated with a predetermined condition (104A); in response to receiving the log data, generate one or more monitor rules (120) comprising at least one anomaly detection signature (121) comprising at least one updated predetermined condition (104B); communicate the one or more monitor rules (120) comprising at least one updated predetermined condition (104B) to the on-prem server (101); receive diagnostic data (130) defining operating conditions (103A) captured during the detection of the anomaly; adjust the at least one updated predetermined condition (104B) to generate an updated monitor rule (120'); and generate the updated monitor rule (120'), wherein the updated monitor rule (120') replaces the one or more monitor rules (120) for use in detecting additional anomalies during operation of the computing system, the detection using the updated monitor rule (120') to enable predictive maintenance in a hybrid server environment (100).

Example Clause 17. The computing system of clause 16, wherein the at least one operating condition comprises a data rate of data exchanged with a hardware memory device, wherein the predetermined condition comprises at least one of a data rate threshold, wherein the detection of the predetermined condition comprises a determination that the data rate falls below the data rate threshold.

Example Clause 18. The computing system of clauses 16 and 17, wherein the at least one operating condition comprises a failure rate of a hardware input/output (I/O) device, wherein the predetermined condition comprises at least one of a failure rate threshold, wherein the detection of the predetermined condition comprises a determination that the failure rate exceeds the failure rate threshold.

Example Clause 19. The computing system of clauses 16 through 18, wherein the at least one operating condition comprises an error rate of a software database, wherein the predetermined condition comprises at least one of an error rate threshold, wherein the detection of the predetermined condition comprises a determination that the error rate exceeds the failure rate threshold.

Example Clause 20. The computing system of clauses 16 through 19, wherein the anomaly detection signature comprises at least one updated predetermined condition, wherein the detection of the anomaly comprises a determination that at least one operating condition meets the at least one updated predetermined condition of the anomaly detection signature.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A computer-implemented method to be performed by a computing system for enabling predictive maintenance in a hybrid server environment, the method comprising:
analyzing system data defining at least one operating condition for detecting a predetermined condition;
in response to detecting the predetermined condition, generating log data defining the at least one operating condition associated with the predetermined condition;
communicating the log data to a primary server, wherein the log data causes the primary server to generate one or more monitor rules comprising at least one anomaly detection signature comprising at least one updated predetermined condition;
receiving the one or more monitor rules comprising at least one updated predetermined condition;
monitoring the at least one operating condition to detect an anomaly based on a comparison of the at least one operating condition and the at least one updated predetermined condition;
in response to detecting the anomaly based on the comparison of the at least one operating condition and the at least one updated predetermined condition, generating a predictive maintenance recommendation describing the anomaly and one or more actions for resolving the anomaly;
generating diagnostic data defining operating conditions captured during the detection of the anomaly;
communicating the diagnostic data to the primary server causing the primary server to adjust the at least one updated predetermined condition for generating an updated monitor rule; and
receiving the updated monitor rule, wherein the updated monitor rule replaces the one or more monitor rules for use in detecting additional anomalies during operation of the computing system, the detection using the updated monitor rule to enable predictive maintenance in a hybrid server environment.

2. The computer-implemented method of claim 1, wherein the at least one operating condition comprises a data rate of data exchanged with a hardware memory device, wherein the predetermined condition comprises at least one of a data rate threshold, wherein the detection of the predetermined condition comprises determining that the data rate falls below the data rate threshold.

3. The computer-implemented method of claim 1, wherein the at least one operating condition comprises a failure rate of a hardware input/output (I/O) device, wherein the predetermined condition comprises at least one of a failure rate threshold, wherein the detection of the predetermined condition comprises determining that the failure rate exceeds the failure rate threshold.

4. The computer-implemented method of claim 1, wherein the at least one operating condition comprises an error rate of a software database, wherein the predetermined condition comprises at least one of an error rate threshold, wherein the detection of the predetermined condition comprises determining that the error rate exceeds the failure rate threshold.

5. The computer-implemented method of claim 1, wherein the anomaly detection signature comprises at least one updated predetermined condition, wherein the detection of the anomaly comprises determining that at least one operating condition meets the at least one updated predetermined condition of the anomaly detection signature.

6. The computer-implemented method of claim 1, further comprising:
determining that the monitor rule is applicable to one or more additional computing devices of a plurality of computing devices of the hybrid server environment; and
in response to determining that the monitor rule is applicable to one or more computing devices, communicating the monitor rule to the one or more computing devices.

7. The computer-implemented method of claim 5, wherein the additional computing devices excludes the computing device that generated the log data for generating the one or more monitor rules.

8. The computer-implemented method of claim 5, wherein the additional computing devices share a common hardware configuration with the computing device that generated the log data.

9. A computing system for enabling predictive maintenance features in a hybrid server environment, comprising:
one or more processing units; and
a non-transitory computer-readable storage medium having encoded thereon computer-executable instructions to cause the one or more processing units to:
analyze system data defining at least one operating condition for detecting a predetermined condition;
in response to detecting the predetermined condition, generate log data defining the at least one operating condition associated with the predetermined condition;
communicate the log data to a primary server, wherein the log data causes the primary server to generate one or more monitor rules comprising at least one anomaly detection signature comprising at least one updated predetermined condition;
receive the one or more monitor rules comprising at least one updated predetermined condition;

monitor the at least one operating condition to detect an anomaly based on a comparison of the at least one operating condition and the at least one updated predetermined condition;

in response to detecting the anomaly based on the comparison of the at least one operating condition and the at least one updated predetermined condition, generate a predictive maintenance recommendation describing the anomaly and one or more actions for resolving the anomaly;

generate diagnostic data defining operating conditions captured during the detection of the anomaly;

communicate the diagnostic data to the primary server causing the primary server to adjust the at least one updated predetermined condition for generating an updated monitor rule; and receive the updated monitor rule, wherein the updated monitor rule replaces the one or more monitor rules for use in detecting additional anomalies during operation of the computing system, the detection using the updated monitor rule to enable predictive maintenance in a hybrid server environment.

10. The computing system of claim 9, wherein the at least one operating condition comprises a data rate of data exchanged with a hardware memory device, wherein the predetermined condition comprises at least one of a data rate threshold, wherein the detection of the predetermined condition comprises a determination that the data rate falls below the data rate threshold.

11. The computing system of claim 9, wherein the at least one operating condition comprises a failure rate of a hardware input/output (I/O) device, wherein the predetermined condition comprises at least one of a failure rate threshold, wherein the detection of the predetermined condition comprises a determination that the failure rate exceeds the failure rate threshold.

12. The computing system of claim 9, wherein the at least one operating condition comprises an error rate of a software database, wherein the predetermined condition comprises at least one of an error rate threshold, wherein the detection of the predetermined condition comprises a determination that the error rate exceeds the failure rate threshold.

13. The computing system of claim 9, wherein the anomaly detection signature comprises at least one updated predetermined condition, wherein the detection of the anomaly comprises a determination that at least one operating condition meets the at least one updated predetermined condition of the anomaly detection signature.

14. The computing system of claim 9, wherein the non-transitory computer-readable storage medium, having additional executable instructions encoded thereon, further causes the one or more processing units to:

determine that the monitor rule is applicable to one or more additional computing devices of a plurality of computing devices of the hybrid server environment; and in response to determining that the monitor rule is applicable to one or more computing devices, communicate the monitor rule to the one or more computing devices.

15. The computing system of claim 9, wherein the additional computing devices excludes the computing device that generated the log data for generating the one or more monitor rules.

16. A computing system for enabling proactive maintenance in a hybrid server environment comprising:

one or more processing units; and a non-transitory computer-readable storage medium having encoded thereon computer-executable instructions to cause the one or more processing units to:

receive log data from an on-prem server defining at least one operating condition associated with a predetermined condition;

in response to receiving the log data, generate one or more monitor rules comprising at least one anomaly detection signature comprising at least one updated predetermined condition;

communicate the one or more monitor rules comprising at least one updated predetermined condition to the on-prem server;

receive diagnostic data defining operating conditions captured during the detection of the anomaly;

adjust the at least one updated predetermined condition to generate an updated monitor rule; and generate the updated monitor rule, wherein the updated monitor rule replaces the one or more monitor rules for use in detecting additional anomalies during operation of the computing system, the detection using the updated monitor rule to enable predictive maintenance in a hybrid server environment.

17. The computing system of claim 16, wherein the at least one operating condition comprises a data rate of data exchanged with a hardware memory device, wherein the predetermined condition comprises at least one of a data rate threshold, wherein the detection of the predetermined condition comprises a determination that the data rate falls below the data rate threshold.

18. The computing system of claim 16, wherein the at least one operating condition comprises a failure rate of a hardware input/output (I/O) device, wherein the predetermined condition comprises at least one of a failure rate threshold, wherein the detection of the predetermined condition comprises a determination that the failure rate exceeds the failure rate threshold.

19. The computing system of claim 16, wherein the at least one operating condition comprises an error rate of a software database, wherein the predetermined condition comprises at least one of an error rate threshold, wherein the detection of the predetermined condition comprises a determination that the error rate exceeds the failure rate threshold.

20. The computing system of claim 16, wherein the anomaly detection signature comprises at least one updated predetermined condition, wherein the detection of the anomaly comprises a determination that at least one operating condition meets the at least one updated predetermined condition of the anomaly detection signature.

* * * * *